United States Patent
Abedini et al.

(10) Patent No.: US 11,750,271 B2
(45) Date of Patent: Sep. 5, 2023

(54) REPEATER CONFIGURATION VIA MULTICAST CONTROL

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/998,942

(22) Filed: Aug. 20, 2020

(65) Prior Publication Data

US 2021/0105062 A1 Apr. 8, 2021

Related U.S. Application Data

(60) Provisional application No. 62/912,512, filed on Oct. 8, 2019.

(51) Int. Cl.
| | |
|---|---|
| *H04W 4/06* | (2009.01) |
| *H04B 7/155* | (2006.01) |
| *H04W 84/04* | (2009.01) |
| *H04W 16/26* | (2009.01) |
| *H04W 72/20* | (2023.01) |

(52) U.S. Cl.
CPC .......... *H04B 7/15507* (2013.01); *H04W 4/06* (2013.01); *H04W 16/26* (2013.01); *H04W 72/20* (2023.01); *H04W 84/047* (2013.01)

(58) Field of Classification Search
CPC ........ H04B 7/14; H04B 7/15507; H04W 4/06
See application file for complete search history.

(56) References Cited

U.S. PATENT DOCUMENTS

| | | | |
|---|---|---|---|
| 7,590,064 B1 * | 9/2009 | Zhang | H04L 47/10 370/235 |
| 2006/0001551 A1 * | 1/2006 | Kraft | A61B 5/14532 128/903 |

(Continued)

OTHER PUBLICATIONS

International Search Report and Written Opinion—PCT/US2020/047368—ISA/EPO—dated Oct. 27, 2020.

*Primary Examiner* — Sulaiman Nooristany
(74) *Attorney, Agent, or Firm* — Holland & Hart LLP

(57) ABSTRACT

Methods, systems, and devices for wireless communications are described. A base station may concurrently configure repeaters in a wireless communications system via multicast control messaging. The base station may identify a quantity of repeaters in communication with the base station. Some repeaters may be in communication with the base station via other repeaters, for example in a chain configuration. The base station may prepare a multicast message including control information for the quantity of repeaters. In some examples, the base station may transmit the multicast message directly to each repeater in the quantity of repeaters, which may be referred to as a single hop control transmission. In some examples, the base station may transmit the multicast message via one or more chains of repeaters, which may be referred to as a multi-hop control transmission. The described techniques may include improved repeater operations and promote efficient repeater communications, among other benefits.

13 Claims, 19 Drawing Sheets

(56) References Cited

U.S. PATENT DOCUMENTS

| | | | |
|---|---|---|---|
| 2007/0072604 A1* | 3/2007 | Wang | H04L 47/24 |
| | | | 455/428 |
| 2008/0141079 A1* | 6/2008 | Chindapol | H04L 1/0041 |
| | | | 714/701 |
| 2008/0259840 A1* | 10/2008 | Yin | H04B 7/2606 |
| | | | 370/315 |
| 2009/0203309 A1* | 8/2009 | Okuda | H04B 7/15542 |
| | | | 455/7 |
| 2011/0222428 A1 | 9/2011 | Charbit et al. | |
| 2012/0147810 A1* | 6/2012 | Wang | H04W 24/02 |
| | | | 370/315 |
| 2014/0348055 A1* | 11/2014 | Hoymann | H04B 7/15557 |
| | | | 370/315 |

* cited by examiner

REPEATER CONFIGURATION VIA MULTICAST CONTROL

CROSS REFERENCE

The present Application for Patent claims the benefit of U.S. Provisional Patent Application No. 62/912,512 by ABEDINI et al., entitled "REPEATER CONFIGURATION VIA MULTICAST CONTROL," filed Oct. 8, 2019, assigned to the assignee hereof, and expressly incorporated by reference herein.

FIELD OF TECHNOLOGY

The following relates generally to wireless communications and more specifically to repeater configuration via multicast control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate via one or more repeaters with a base station. As the density of repeater deployment in a system increases, signaling overhead and latency may increase, which may lead to degraded performance or efficiency.

SUMMARY

The described techniques relate to improved methods, systems, devices, and apparatuses that support repeater configuration via multicast control. Generally, the described techniques provide for enabling a base station to concurrently configure repeaters in a wireless communications system via multicast control messaging. The base station may identify a quantity of repeaters in communication with the base station. Some repeaters may be in communication with the base station via other repeaters, for example in a chain configuration. The base station may prepare a multicast message including control information for the quantity of repeaters. In some examples, the base station may transmit the multicast message directly to each repeater in the quantity of repeaters, which may be referred to as a single hop control transmission. In some examples, the base station may transmit the multicast message via one or more chains of repeaters, which may be referred to as a multi-hop control transmission. The described techniques may include improved repeater operations and, in some examples, promote efficient repeater communications, among other benefits.

A method of wireless communications at a base station is described. The method may include identifying a set of repeaters associated with the base station, where the set of repeaters includes at least a first repeater and a second repeater, determining a multicast message including common control information indicating one or more configuration parameters for the set of repeaters, and transmitting the multicast message to one or more repeaters of the set of repeaters.

An apparatus for wireless communications at a base station is described. The apparatus may include a processor, memory coupled with the processor, and instructions stored in the memory. The instructions may be executable by the processor to cause the apparatus to identify a set of repeaters associated with the base station, where the set of repeaters includes at least a first repeater and a second repeater, determine a multicast message including common control information indicating one or more configuration parameters for the set of repeaters, and transmit the multicast message to one or more repeaters of the set of repeaters.

Another apparatus for wireless communications at a base station is described. The apparatus may include means for identifying a set of repeaters associated with the base station, where the set of repeaters includes at least a first repeater and a second repeater, determining a multicast message including common control information indicating one or more configuration parameters for the set of repeaters, and transmitting the multicast message to one or more repeaters of the set of repeaters.

A non-transitory computer-readable medium storing code for wireless communications at a base station is described. The code may include instructions executable by a processor to identify a set of repeaters associated with the base station, where the set of repeaters includes at least a first repeater and a second repeater, determine a multicast message including common control information indicating one or more configuration parameters for the set of repeaters, and transmit the multicast message to one or more repeaters of the set of repeaters.

Some examples of the method, apparatuses, and non-transitory computer-readable medium described herein may further include operations, features, means, or instructions for transmitting the multicast message in a first frequency band, and transmitting a message to the first repeater in a second frequency band, where the first frequency band and the second frequency band may be the same or different.

Some examples of the method, apparatuses, and non-transitory computer-readable medium described herein may further include operations, features, means, or instructions for transmitting a group common radio network temporary identifier associated with the multicast message to the one or more repeaters.

Some examples of the method, apparatuses, and non-transitory computer-readable medium described herein may further include operations, features, means, or instructions for transmitting an indication of a forwarding instruction associated with the multicast message to the one or more repeaters.

In some examples of the method, apparatuses, and non-transitory computer-readable medium described herein, the indication of the forwarding instruction may be included in one or more layer 1 signals, one or more downlink control information messages, one or more scheduling grants, or a combination thereof.

In some examples of the method, apparatuses, and non-transitory computer-readable medium described herein, the forwarding instruction indicates at least a portion of the multicast message to be forwarded to the second repeater.

In some examples of the method, apparatuses, and non-transitory computer-readable medium described herein, the forwarding instruction indicates at least a second portion of the multicast message to be forwarded to one or more additional repeaters.

In some examples of the method, apparatuses, and non-transitory computer-readable medium described herein, the common control information includes a first information element associated with the first repeater and a second information element associated with the second repeater.

In some examples of the method, apparatuses, and non-transitory computer-readable medium described herein, the common control information includes a common information element associated with the first repeater and the second repeater.

In some examples of the method, apparatuses, and non-transitory computer-readable medium described herein, the one or more configuration parameters include a forwarding direction, one or more beamforming parameters, a power setting, or a combination thereof.

In some examples of the method, apparatuses, and non-transitory computer-readable medium described herein, the common control information includes one or more indices corresponding to the one or more configuration parameters.

In some examples of the method, apparatuses, and non-transitory computer-readable medium described herein, the multicast message may be transmitted in a physical downlink control channel, a physical downlink shared channel, or a combination thereof.

A method of wireless communications at a first repeater is described. The method may include receiving, from a base station, a multicast message including common control information for a set of repeaters, the set of repeaters including at least the first repeater and a second repeater, identifying one or more configuration parameters associated with the first repeater based on the common control information, and communicating with one or more wireless devices based on the configuration parameters.

An apparatus for wireless communications at a first repeater is described. The apparatus may include a processor, memory coupled with the processor, and instructions stored in the memory. The instructions may be executable by the processor to cause the apparatus to receive, from a base station, a multicast message including common control information for a set of repeaters, the set of repeaters including at least the first repeater and a second repeater, identify one or more configuration parameters associated with the first repeater based on the common control information, and communicate with one or more wireless devices based on the configuration parameters.

Another apparatus for wireless communications at a first repeater is described. The apparatus may include means for receiving, from a base station, a multicast message including common control information for a set of repeaters, the set of repeaters including at least the first repeater and a second repeater, identifying one or more configuration parameters associated with the first repeater based on the common control information, and communicating with one or more wireless devices based on the configuration parameters.

A non-transitory computer-readable medium storing code for wireless communications at a first repeater is described. The code may include instructions executable by a processor to receive, from a base station, a multicast message including common control information for a set of repeaters, the set of repeaters including at least the first repeater and a second repeater, identify one or more configuration parameters associated with the first repeater based on the common control information, and communicate with one or more wireless devices based on the configuration parameters.

Some examples of the method, apparatuses, and non-transitory computer-readable medium described herein may further include operations, features, means, or instructions for receiving the multicast message in a first frequency band, and communicating with the one or more wireless devices in a second frequency band, where the first frequency band and the second frequency band may be the same or different.

Some examples of the method, apparatuses, and non-transitory computer-readable medium described herein may further include operations, features, means, or instructions for receiving a group common radio network temporary identifier associated with the multicast message.

Some examples of the method, apparatuses, and non-transitory computer-readable medium described herein may further include operations, features, means, or instructions for transmitting at least a portion of the multicast message to the second repeater based on a forwarding instruction associated with the multicast message.

Some examples of the method, apparatuses, and non-transitory computer-readable medium described herein may further include operations, features, means, or instructions for receiving one or more samples of the multicast message, and buffering the received one or more samples, where transmitting the portion of the multicast message may be based on the buffering.

Some examples of the method, apparatuses, and non-transitory computer-readable medium described herein may further include operations, features, means, or instructions for decoding the multicast message based on the forwarding instruction, and encoding the multicast message based on the decoding, where transmitting the portion of the multicast message may be based on the encoding.

Some examples of the method, apparatuses, and non-transitory computer-readable medium described herein may further include operations, features, means, or instructions for decoding the multicast message based on the forwarding instruction, and generating a message including the portion of the multicast message based on the decoding, where transmitting the portion of the multicast message to the second repeater includes transmitting the generated message.

Some examples of the method, apparatuses, and non-transitory computer-readable medium described herein may further include operations, features, means, or instructions for receiving an indication of the forwarding instruction in one or more layer 1 signals, one or more downlink control information messages, one or more scheduling grants, or a combination thereof.

In some examples of the method, apparatuses, and non-transitory computer-readable medium described herein, the forwarding instruction indicates the portion of the multicast to be forwarded to the second repeater.

In some examples of the method, apparatuses, and non-transitory computer-readable medium described herein, the forwarding instruction indicates at least a second portion of the multicast message to be forwarded to one or more additional repeaters.

In some examples of the method, apparatuses, and non-transitory computer-readable medium described herein, the common control information includes a first information element associated with the first repeater and a second information element associated with the second repeater.

In some examples of the method, apparatuses, and non-transitory computer-readable medium described herein, the common control information includes a common information element associated with the first repeater and the second repeater.

In some examples of the method, apparatuses, and non-transitory computer-readable medium described herein, the one or more configuration parameters include a forwarding direction, one or more beamforming parameters, a power setting, or a combination thereof.

In some examples of the method, apparatuses, and non-transitory computer-readable medium described herein, the common control information includes one or more indices corresponding to the one or more configuration parameters.

In some examples of the method, apparatuses, and non-transitory computer-readable medium described herein, the multicast message may be received in a physical downlink control channel, a physical downlink shared channel, or a combination thereof.

DETAILED DESCRIPTION

Figure 1:
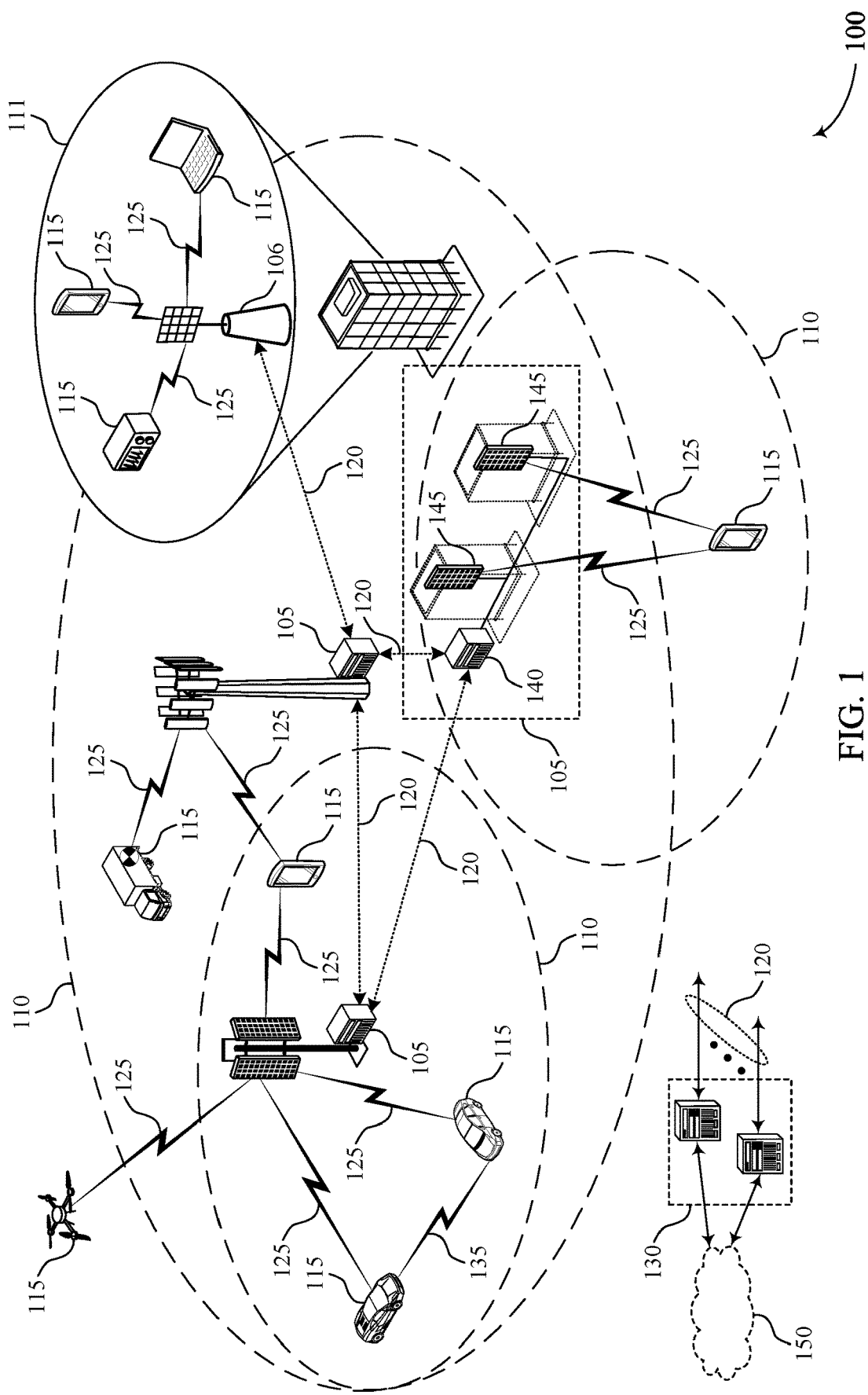
FIGS. 1 and 2 illustrate examples of wireless communications systems that support repeater configuration via multicast control in accordance with aspects of the present disclosure.

Some wireless communication systems, such as fifth generation (5G) systems which may be referred to as New Radio (NR) systems, may include network nodes such as base stations communicating with user equipment (UE). Base stations may communicate directly with UEs, or via repeaters which may extend the coverage of the base stations. For example, a wireless communications system may support millimeter wave (mmW) communications in an extremely high frequency (EHF) band of the radio frequency spectrum. While mmW communications may allow for greater bandwidths and higher data transmission rates than communications in lower frequency ranges, mmW communications may be more susceptible to propagation loss and signal blockage (e.g., intervening buildings or other objects), which may reduce the effective range over which mmW signals may be transmitted. To increase the effective range of mmW communications, the wireless communications system may include repeaters to extend the coverage of base stations. A repeater may be configured to receive a signal (e.g., an analog signal, an mmW signal, etc.) from a first wireless device (e.g., a base station or a UE), amplify the power of the received signal, and transmit the amplified signal to a second wireless device (e.g., a UE or a base station).

In some examples, a quantity of repeaters may be connected to a base station in a chain configuration. That is, a first repeater may receive signaling from the base station, and transmit the signaling to a second repeater, which may transmit the signaling to another wireless device (e.g., a third repeater, a UE, etc.). The chain configuration may extend the coverage of the base station, but may also result in significant control signaling overhead and latency in a dense repeater deployment. For example, a base station may configure a number of parameters (e.g., at least one of one or more beamforming parameters, a forwarding direction, or a power setting, or any combination thereof) of each repeater in a chain in order to transmit and receive communications via the repeaters.

In an example, a base station may determine to schedule a transmission from a UE (e.g., an uplink data transmission from the UE to the base station). The UE may be served by a second repeater, which may communicate in a chain via a first repeater with the base station. The base station may configure the first repeater and the second repeater in order to facilitate the transmission from the UE. The base station may transmit a first control message to the first repeater, where the first control message may configure the first repeater to receive and forward messages to the second repeater (i.e., to establish a downstream path from the base station to the second repeater) and further configure the first repeater to receive and forward messages from the second repeater (i.e., to establish an upstream path from the second repeater to the base station). After a first duration (e.g., a first quantity N1 of slots), which may correspond to a duration in which the first repeater processes the first control message and configures antennas at the first repeater to establish the downstream path and the upstream path, the base station may transmit a second control message to the first repeater, which the first repeater may forward to the second repeater. After a second duration (e.g., a second quantity N2 of slots), which may include the first duration as well as a duration in which the second repeater processes the second control message and configures antennas for communicating with the UE, the first repeater and the second repeater may be prepared to facilitate the transmission from the UE to the base station. As the density of repeater deployment increases, the control signaling overhead (e.g., the quantity of control messages) and communications latency (e.g., the combined processing time for the chain of repeaters) may also increase, which may lead to degraded performance or efficiency.

Techniques are described herein to enable a base station to concurrently configure repeaters via multicast control messaging. A base station may identify a quantity of repeaters in communication with the base station. Some repeaters may be in communication with the base station via other repeaters, for example in a chain configuration. The base station may prepare a multicast message including control information for the quantity of repeaters. In some examples, the control information may include information elements common to the quantity of repeaters, as well as information elements specific to an individual repeater or a subset of repeaters in the quantity of repeaters. In some examples, the control information may include one or more configuration parameters (e.g., switching the repeaters on or off, setting a forwarding direction, etc.) to be adopted by the quantity of repeaters, or the control information may indicate an index corresponding to a preconfigured set of parameters for the repeaters. In some examples, the multicast message may be included in a physical downlink control channel (PDCCH) transmission, a physical downlink shared channel (PDSCH) transmission, or a combination thereof. In some examples, the base station may transmit a same (e.g., group common) radio network temporary identifier (RNTI) to the quantity of repeaters, where the quantity of repeaters may identify the multicast message based on the RNTI. In some examples, a repeater may belong to multiple sets of repeaters, and may have a respective RNTI associated with each set.

In some examples, the base station may transmit the multicast message directly to each repeater in the quantity of repeaters, which may be referred to as a single hop control transmission. In some examples, the base station may transmit the multicast message in a different (e.g., lower) frequency band (which may be referred to as an out of band transmission), in order for the multicast message to reach the repeaters that may be outside the range of mmW communications from the base station. In some examples, the base station may transmit the multicast message in the EHF band. The repeaters may be able to successfully receive the multicast message with a higher signal to noise ratio (SNR) than for data transmissions, which may increase the effective range of mmW communications such as the multicast message from the base station.

In some examples, the base station may transmit the multicast message via one or more chains of repeaters, which may be referred to as a multi-hop control transmission. The multicast message may be intended for multiple repeaters along the chains. Each repeater in the chains may receive the multicast message, acquire the relevant control information, and forward at least a portion of the multicast message to repeaters downstream.

In some examples, a repeater may receive the multicast message, then concurrently decode the message and forward the message to one or more downstream repeaters. In some examples, the repeater may have a single downstream repeater, and the repeater may forward the multicast message to the downstream repeater. In some examples, the repeater may use a wide beam or multiple concurrent beams to forward the multicast message to multiple downstream repeaters. In some examples, the repeater may forward the multicast message to a subset of the downstream repeaters based on a configuration received from the base station. For example, the base station may transmit (i.e., in advance of the multicast message transmission) one or more downlink control information (DCI) messages, or a layer 1 (L1) signal, or a combination thereof, to the repeater configuring chain forwarding for the multicast message. In some examples, the base station may indicate to the repeater that a control message received on a set of time resources is to be forwarded to one or more downstream repeaters.

In some examples, a repeater may receive and decode the multicast message, acquire relevant information, then transmit a control message to one or more downstream repeaters. In some examples, the repeater may buffer digital samples of the multicast message, then transmit the buffered samples to the downstream repeaters. Additionally or alternatively, the repeater may decode the multicast message, then re-encode the multicast message (or generate a new control message) to forward to the downstream repeaters.

Particular aspects of the subject matter described herein may be implemented to realize one or more advantages. For example, because the base station configures associated repeaters via multicast control messages, the control signaling overhead may decrease. Additionally, downstream repeaters may receive control signaling without delays associated with the processing time for upstream repeaters. As a result, the latency of wireless communications may decrease. The described techniques may additionally support improvements in power savings, among other advantages. As such, supported techniques may include improved repeater operations and, in some examples, may promote improved repeater transmission efficiencies, among other benefits.

Aspects of the disclosure are initially described in the context of wireless communications systems. Additional examples of transmission schemes and a process flow are then discussed. Aspects of the disclosure are further illustrated by and described with reference to apparatus diagrams, system diagrams, and flowcharts that relate to repeater configuration via multicast control.

FIG. 1 illustrates an example of a wireless communications system 100 that supports repeater configuration via multicast control in accordance with aspects of the present disclosure. The wireless communications system 100 may include one or more base stations 105, one or more repeaters 106, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band. In some examples, the wireless communications system 100 may support mmW communications between the UEs 115, the base stations 105, and the repeaters 106, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may include repeaters 106 to extend the coverage of base stations 105. Repeaters 106 may reduce the effects of propagation loss and signal blockage in a cell by filling coverage holes, especially for mmW communications or other high-frequency applications. A repeater 106 may be configured to receive a signal (e.g., an analog signal, an mmW signal, etc.) from a first wireless device (e.g., a base station 105 or a UE 115), amplify the power of the received signal, and transmit the amplified signal to a second wireless device (e.g., a UE 115 or a base station 105). The repeater 106 may be equipped with multiple antennas, which may be used to employ techniques such as beamforming.

Each repeater 106 may provide a coverage area 111 over which UEs and the repeater 106 may establish one or more communication links 125. The coverage area 111 may be an example of a geographic area over which a repeater 106 and a UE 115 may support the communication of signals according to one or more radio access technologies. The repeater 106 may communicate with a base station 105, for example via a wireless backhaul link 120, and facilitate communications between the UEs 115 in the coverage area 111 with the base station 105, in order to extend the coverage of the base station 105 to include the coverage area 111.

A repeater 106 may include a control interface for receiving and processing control signals from a base station 105. In some examples, the repeater 106 may receive control signals via an out of band transmission, which may be transmitted using a radio technology (e.g., Bluetooth) or a frequency (e.g., NB-IoT, a frequency below 6 GHz, etc.) that is different from the radio technology or frequency used for receiving and transmitting signals (e.g., mmW communications). In some examples, the repeater 106 may receive control signals via an in band transmission, for example using a BWP that is smaller than the bandwidth used for receiving and transmitting signals.

In some examples, a quantity of repeaters 106 may be connected to a base station 105 in a chain configuration. The chain configuration may extend the coverage of the base station 105, but may also result in significant control signaling overhead and latency in a dense deployment of repeaters 106. To reduce the overhead and latency, the base station 105 may concurrently configure the quantity of repeaters 106 by transmitting a multicast message to the repeaters 106, where the multicast message includes control information. In some examples, the control information may include information elements common to the quantity of repeaters 106, as well as information elements specific to an individual repeater 106 or a subset of repeaters 106 in the quantity of repeaters 106. In some examples, the control information may include one or more configuration parameters to be adopted by the quantity of repeaters 106, or the control information may indicate an index corresponding to a preconfigured set of parameters for the repeaters. The wireless communications system 100 may therefore include features for improved power savings and, in some examples, may promote improved transmission efficiencies, among other benefits.

Figure 2:
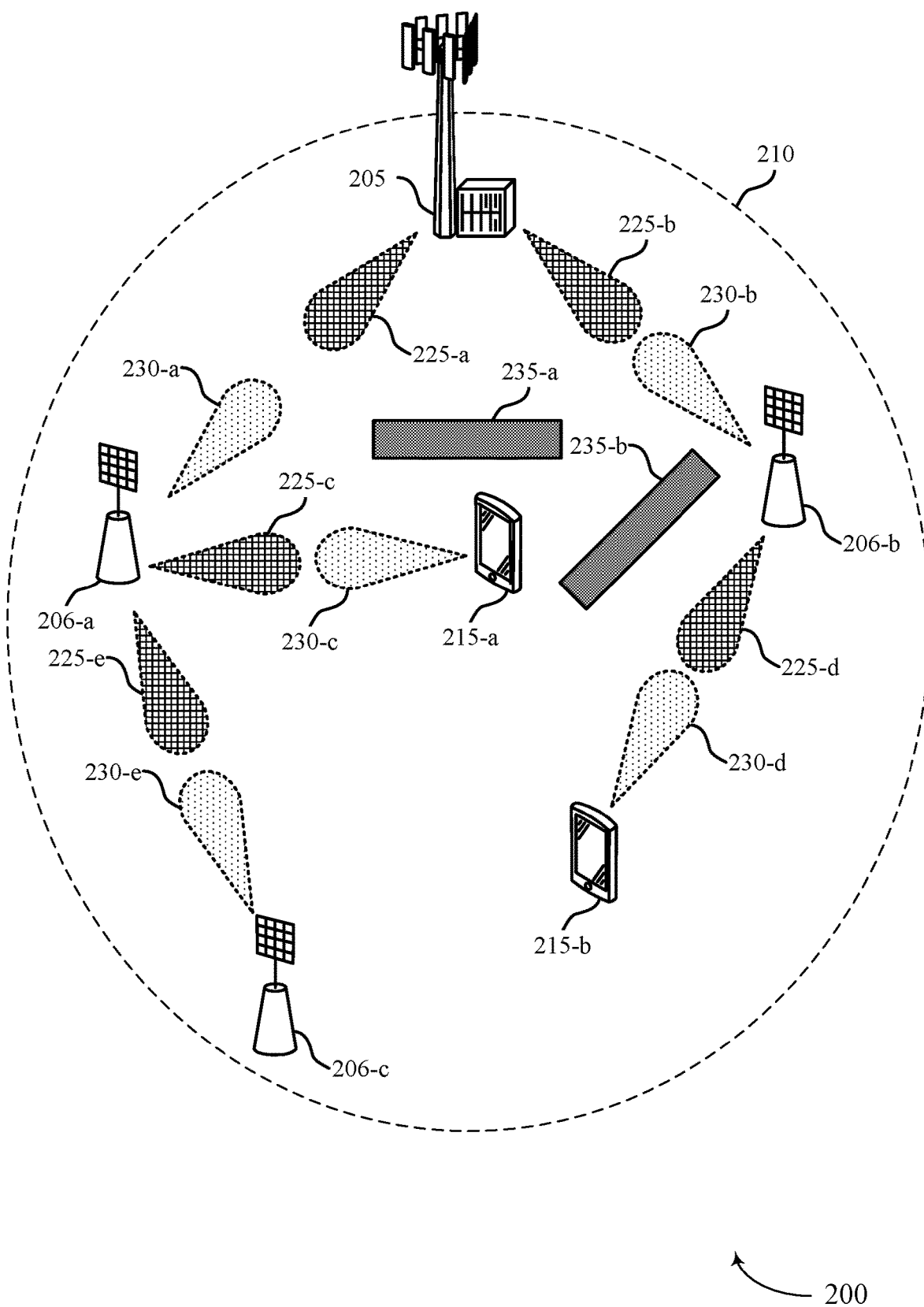

FIG. 2 illustrates an example of a wireless communications system 200 that supports repeater configuration via multicast control in accordance with aspects of the present disclosure. In some examples, the wireless communications system 200 may implement aspects of wireless communication system 100. For example, the wireless communications system 200 may include a base station 205, repeaters 206, and UEs 215, which may be examples of the corresponding devices described with reference to FIG. 1. The wireless communications system 200 may include features for improved repeater operations, among other benefits.

In the wireless communications system 200, the base station 205 may provide a geographic coverage area 210. UEs 215 within the geographic coverage area 210 may transmit and receive communications as scheduled by the base station 205. Devices in the wireless communications system 200 may use beamforming techniques to transmit using transmission beams 225, and receive transmissions using reception beams 230.

The base station 205 may transmit in the mmW spectrum band. As illustrated in FIG. 2, the base station 205 may be unable to communicate directly with the UE 215-*a* or the UE 215-*b* because of obstructions 235-*a* and 235-*b*. In some examples, the obstructions 235-*a* and 235-*b* may represent intervening buildings or other objects. To fill the coverage holes, the base station 205 may communicate with the UEs 215 via the repeaters 206. For example, the base station 205 may communicate with the UE 215-*a* via the repeater 206-*a*, and the base station 205-*a* may communicate with the UE 215-*b* via the repeater 206-*b*. Alternatively, although not shown in FIG. 2, the base station 205 may communicate with the UE 215-*b* via the repeater 206-*a* and the repeater 206-*c*, where the repeater 206-*a* and the repeater 206-*c* may be configured as a chain to extend the coverage of the base station 205. The repeaters 206 may extend the coverage of the base station 205, but may also result in significant control signaling overhead and latency, for example in the chain configuration.

In some examples, the base station 205 may determine to schedule uplink transmissions from the UEs 215-*a* and 215-*b*. Due to the obstructions 235-*a* and 235-*b*, the base station 205 may determine to schedule and receive the uplink transmissions via the repeaters 206. Rather than determine and transmit individual control signaling to each repeater 206 for scheduling the uplink transmissions from the UEs 215, the base station 205 may prepare a multicast message including common control information for the repeaters 206. As illustrated in FIG. 2, the base station 205 may transmit the multicast message to the repeater 206-*a* using the transmission beam 225-*a*, and the repeater 206-*a* may receive the multicast message using the reception beam 230-*a*. Similarly, the base station 205 may transmit the multicast message to the repeater 206-*b* using the transmission beam 225-*b*, and the repeater 206-*b* may receive the multicast message using the reception beam 230-*b*. In some examples, the repeater 206-*a* may receive the multicast message, acquire the control information relevant to the repeater 206-*a*, and forward at least a portion of the multicast message to the repeater 206-*c* using the transmission beam 225-*e*. The repeater 206-*c* may receive the forwarded message using the reception beam 230-*e*.

The multicast message from the base station 205 may include configuration parameters for communicating the UEs 215-*a* and 215-*b*. For example, the multicast message may configure the repeater 206-*a* for transmitting an uplink grant to the UE 215-*a* using the transmission beam 225-*c*, and the UE 215-*a* may receive the uplink grant using the reception beam 230-*c*. Similarly, the multicast message may configure the repeater 206-*b* for transmitting an uplink grant to the UE 215-*b* using the transmission beam 225-*d*, and the UE 215-*b* may receive the uplink grant using the reception beam 230-*d*.

Figure 3:
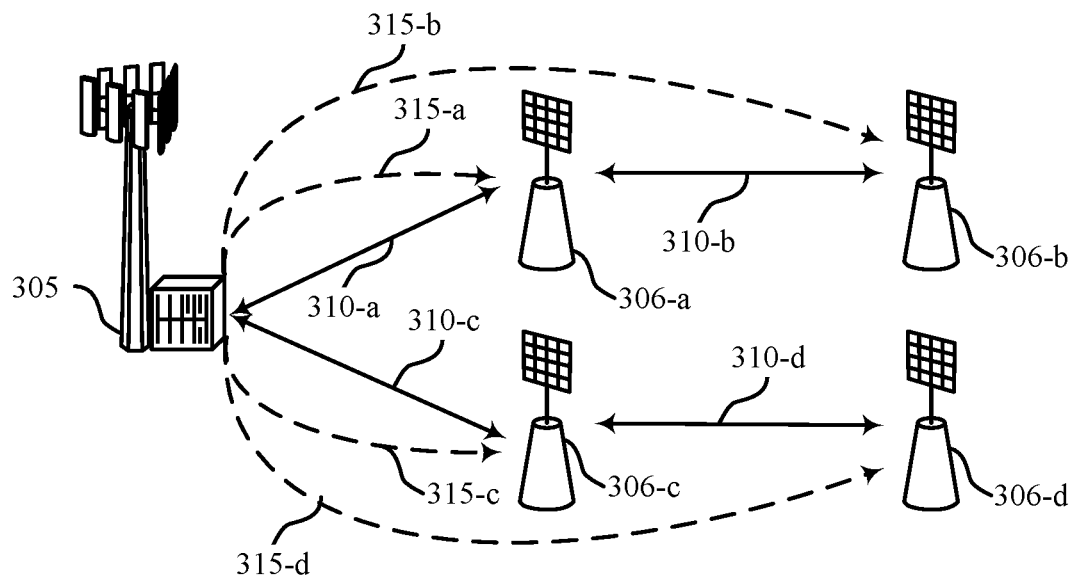
FIG. 3 illustrates an example of a transmission scheme that supports repeater configuration via multicast control in accordance with aspects of the present disclosure.
Figure 3:
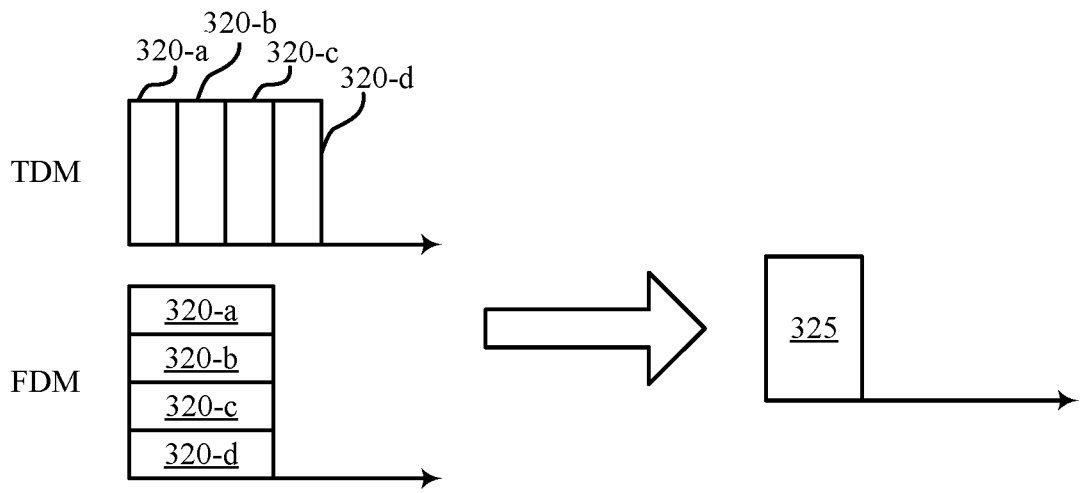

FIG. 3 illustrates an example of a transmission scheme 300 that supports repeater configuration via multicast control in accordance with aspects of the present disclosure. In some examples, the transmission scheme 300 may implement aspects of wireless communication systems 100 and 200. The transmission scheme 300 may be associated with communications between repeaters 306 and a base station 305, which may be examples of corresponding devices described with reference to FIGS. 1 and 2. The transmission scheme 300 may allow the repeaters 306 to efficiently receive control information via multicast messages from the base station 305.

The base station 305 may communicate with the repeaters 306 in the mmW spectrum band using data paths 310. Additionally, the base station may transmit control signaling to the repeaters 306 using control signaling paths 315. In some examples, the control signaling paths 315 may represent out of band transmissions to the repeaters 306 in a different (e.g., lower) frequency band, in order for control signaling to reach the repeaters 306 that may be outside the range of mmW communications from the base station 305 (i.e., the repeaters 306-*b* and 306-*d*). In some examples, the control signaling paths 315 may represent in band transmissions to the repeaters 306, for example in a smaller BWP than the bandwidth associated with the data paths 310. The repeaters 306 may be able to successfully receive control signaling with a higher SNR than for data transmissions, which may increase the effective range of mmW communications from the base station 305.

As illustrated in FIG. 3, rather than transmitting individual control messages 320 to each repeater 306 (e.g., using TDM or FDM techniques) via the data paths 310, the base station 305 may transmit a multicast message 325 including common control information to the repeaters 306 in a single hop control transmission. Specifically, the base station 305 may transmit the multicast message to the repeater 306-*a* via the control signaling path 315-*a*, to the repeater 306-*b* via the control signaling path 315-*b*, to the repeater 306-*c* via the control signaling path 315-*c*, and to the repeater 306-*d* via the control signaling path 315-*d*.

In some examples, control information in the multicast message 325 may include information elements common to all the repeaters 306, as well as information elements specific to an individual repeater 306 (e.g., the repeater 306-*c*) or a subset of repeaters 306 (e.g., the repeater 306-*a* and the repeater 306-*b*). In some examples, the control information may include one or more configuration parameters (e.g., switching the repeaters on or off, setting a forwarding direction, etc.) to be adopted by the repeaters 306, or the control information may indicate an index corresponding to a preconfigured set of parameters for the repeaters 306. In some examples, the multicast message 325 may be included in a PDCCH transmission, a PDSCH transmission, or a combination thereof. In some examples, the base station 305 may transmit a group common RNTI to the repeaters 306, where the repeaters 306 may identify the multicast message 325 based on the RNTI.

In some examples, the multicast message 325 may be transmitted using more time and frequency resources than an individual control message 320 (e.g., the individual control message 320-*a* for the repeater 306-*a*). However, the multicast message 325 may use less time and frequency resources than the combination of the individual control messages 320-*a* through 320-*d* (e.g., as a result of jointly encoding the information from individual control messages 320-*a* through 320-*d*), and so may reduce the control signaling overhead for configuring the repeaters 306.

Figure 4:
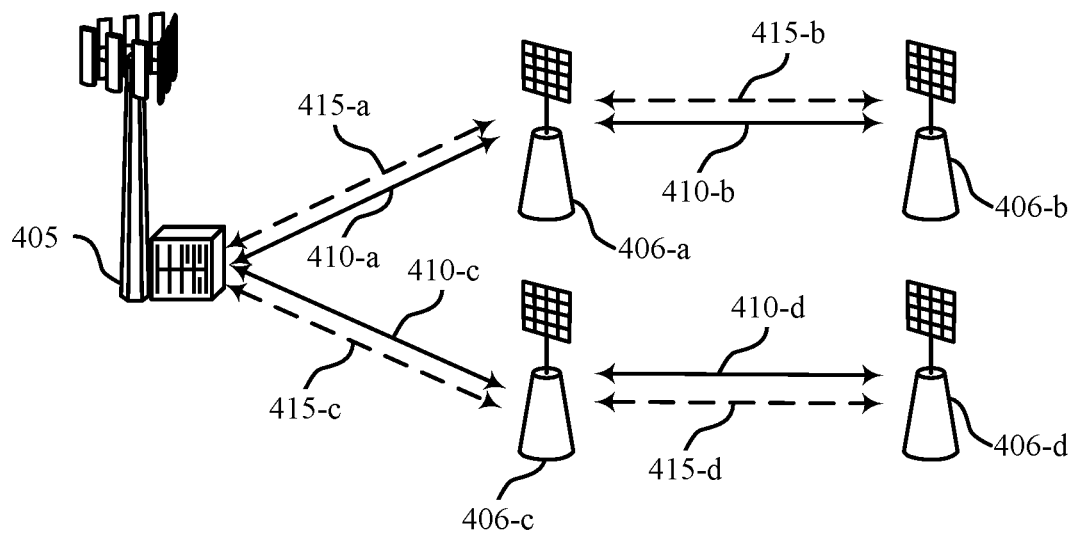
FIG. 4 illustrates an example of a transmission scheme that supports repeater configuration via multicast control in accordance with aspects of the present disclosure.
Figure 4:
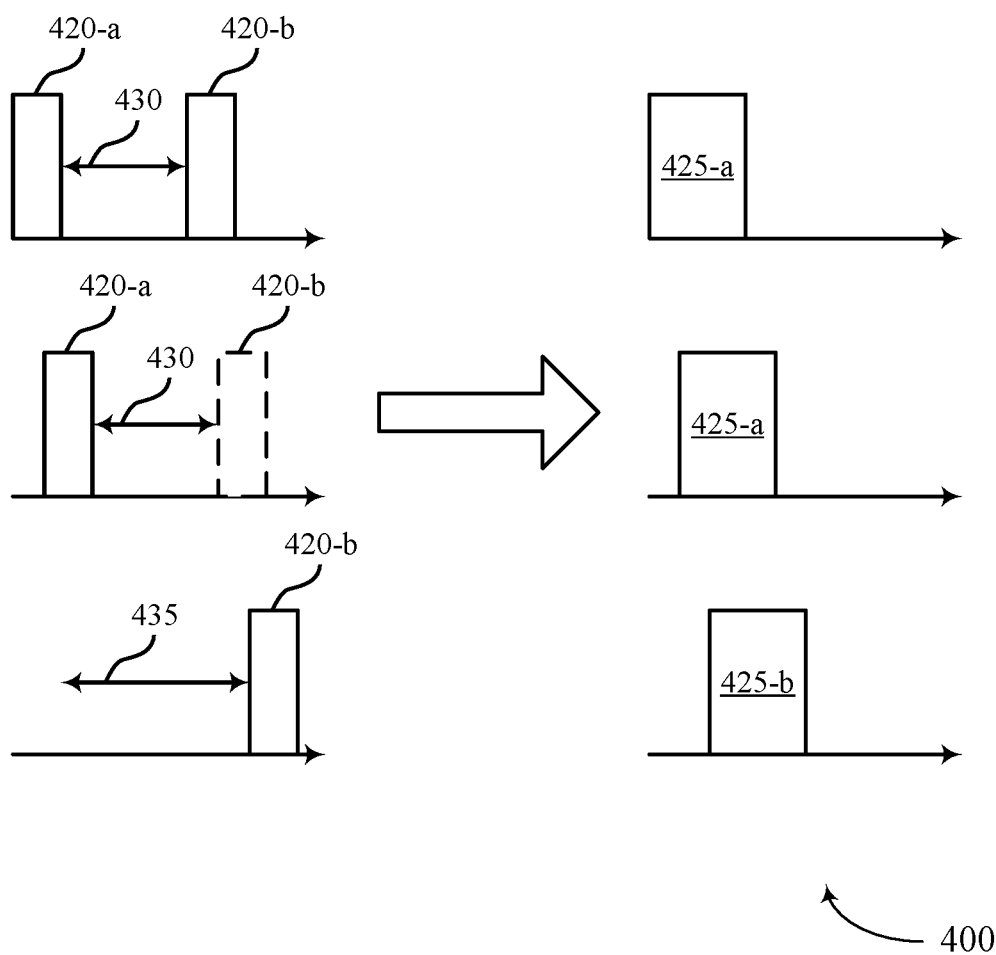

FIG. 4 illustrates an example of a transmission scheme 400 that supports repeater configuration via multicast control in accordance with aspects of the present disclosure. In some examples, the transmission scheme 400 may implement aspects of wireless communication systems 100 and 200. The transmission scheme 400 may be associated with communications between repeaters 406 and a base station 405, which may be examples of corresponding devices described with reference to FIGS. 1 and 2. The transmission scheme 400 may allow the repeaters 406 to efficiently receive and process control information via multicast messages from the base station 405.

The base station 405 may communicate with the repeaters 406 in the mmW spectrum band using data paths 410. Additionally, the base station 405 may transmit control signaling to the repeaters 406 using control signaling paths 415. In some examples, the control signaling paths 415 may represent in band transmissions to the repeaters 406, for example in a smaller BWP than the bandwidth associated with the data paths 410.

In an example, the base station 405 may determine to schedule an uplink transmission from a UE (not shown). The UE may be served by a repeater 406-b, which may communicate in a chain via a repeater 406-a with the base station 405. The base station 405 may configure the repeater 406-a and the repeater 406-b in order to facilitate the transmission from the UE. The base station 405 may transmit a control message 420-a to the repeater 406-a, where the control message 420-a may configure the repeater 406-a to receive and forward messages to the repeater 406-b (i.e., to establish a downstream path from the base station 405 to the repeater 406-b) and further configure the repeater 406-a to receive and forward messages from the repeater 406-b (i.e., to establish an upstream path from the repeater 406-b to the base station 405). After a duration 430 (e.g., N1 slots), which may correspond to a duration in which the repeater 406-a processes the control message 420-a and configures antennas at the repeater 406-a to establish the downstream path and the upstream path, the base station 405 may transmit a control message 420-b to the repeater 406-a, which the repeater 406-a may forward to the repeater 406-b. The repeater 406-b may receive the control message 420-a following a duration 435 after the control message 420-a is transmitted, where the duration 435 may include the duration 430 as well as transmission times for the control messages 420-a and 420-b. As the deployment density of the repeaters 406 increases, the control signaling overhead (e.g., the quantity of control messages 420) and communications latency (e.g., the combined processing time for the chain of repeaters 406) may also increase, which may lead to degraded performance or efficiency.

Rather than transmit the individual control messages 420, the base station 405 may transmit multicast messages 425 including common control information to the repeaters 406 in a multi-hop control transmission. For example, the base station 405 may transmit a multicast message 425-a to the repeater 406-a via the control signaling path 415-a. The repeater 406-a may receive the multicast message 425-a, acquire control information relevant to the repeater 406-a, and forward a multicast message 425-b to the repeater 406-b. The multicast message 425-b may include at least a portion of the multicast message 425-a.

In some examples, the multicast message 425-a and the multicast message 425-b may include the same control information. For example, the repeater 406-a may receive the multicast message 425-a, then concurrently decode the multicast message 425-a and forward the multicast message 425-b to the repeater 406-b. In some examples, the base station 405 may transmit (i.e., before transmitting the multicast message 425-a) one or more DCI messages, or an L1 signal, or a combination thereof, to the repeater 425-a configuring chain forwarding for the multicast message 425-a. In some examples, the base station 425-a may indicate to the repeater 406-a that a control message received on a set of time resources (i.e., the multicast message 425-a) is to be forwarded to the repeater 406-b.

In some examples, the repeater 406-a may receive and decode the multicast message 425-a, acquire relevant control information, and then transmit the multicast message 425-b to the repeater 406-b. In some examples, the repeater 406-a may buffer digital samples of the multicast message 425-a, then transmit the buffered samples to the repeater 406-b in the multicast message 425-b. Additionally or alternatively, the repeater 406-a may decode the multicast message 425-a, then re-encode the multicast message 425-a (or generate a new control message) to forward to the repeater 406-b as the multicast message 425-b.

In some examples, the multicast message 425-a may be transmitted using more time and frequency resources than an individual control message 420 (e.g., the individual control message 420-a for the repeater 406-a). However, the multicast message 425-a may use less time and frequency resources than the combination of the individual control messages 420-a and 420-b (e.g., as a result of jointly encoding the information from individual control messages 420-a and 420-b), and so may reduce the control signaling overhead for configuring the repeaters 406. Additionally, the multicast message 425-b may be received at the repeater 306-b with less latency (e.g., after a duration less than the duration 435) than the control message 420-b.

Figure 5:
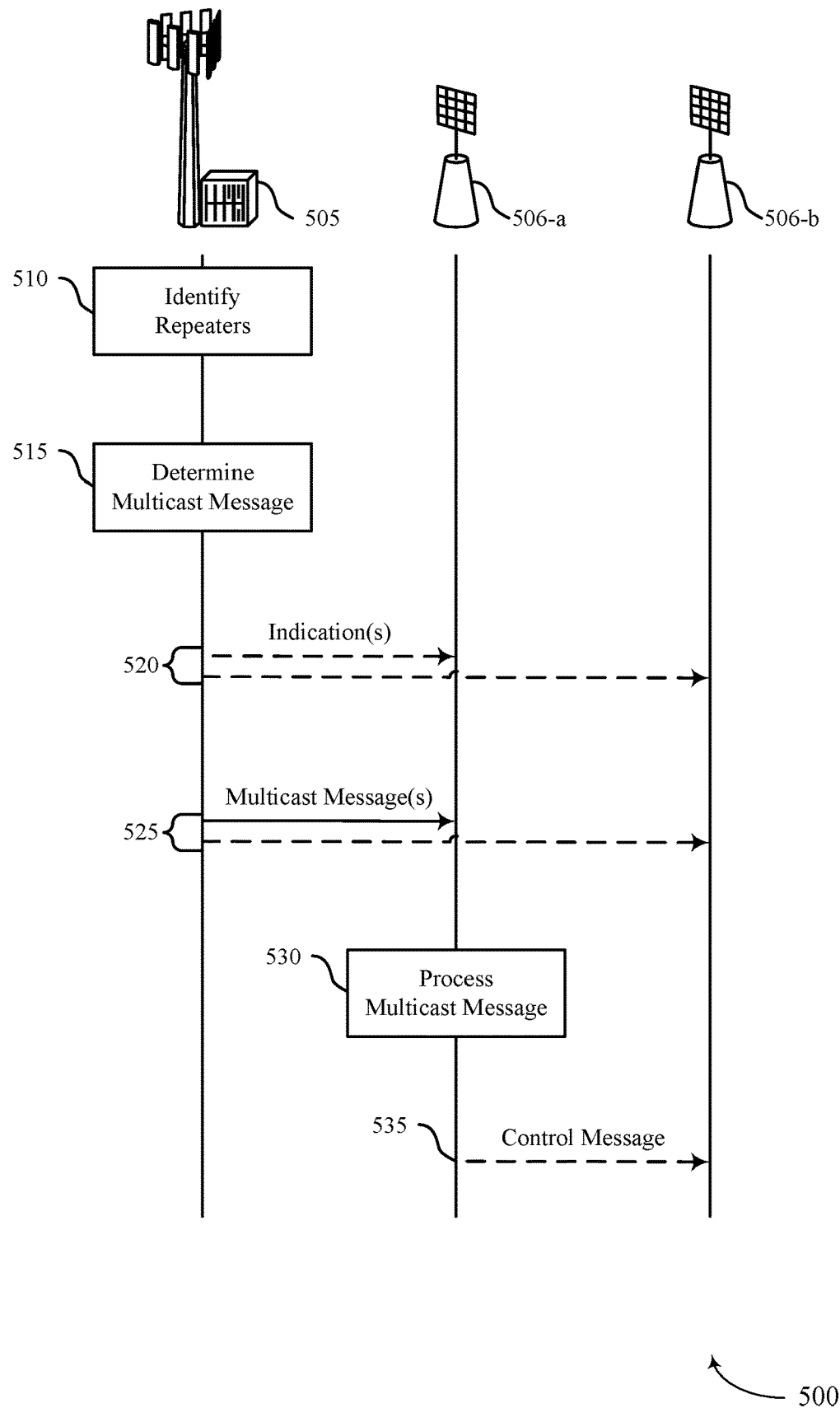
FIG. 5 illustrates an example of a process flow that supports repeater configuration via multicast control in accordance with aspects of the present disclosure.

FIG. 5 illustrates an example of a process flow 500 that supports repeater configuration via multicast control in accordance with aspects of the present disclosure. In some examples, process flow 500 may be implemented by or may implement aspects of wireless communication systems 100 and 200. For example, the process flow 500 may include example operations associated with one or more of a base station 505 and repeaters 506, which may be examples of the corresponding devices described with reference to FIGS. 1 and 2. In the following description of the process flow 500, the operations between the base station 505 and the repeaters 506 may be transmitted in a different order than the example order shown, or the operations performed by the base station 505 and the repeaters 506 may be performed in different orders or at different times. Some operations may also be omitted from the process flow 500, and other operations may be added to the process flow 500. The operations performed by the base station 505 and the repeaters 506 may support improvement to communication operations at the repeaters 506 and, in some examples, may promote improvements to reliability of the repeaters 506, among other benefits.

At 510, the base station 505 may identify a quantity of repeaters 506 in communication with the base station 505, which may include the repeater 506-a and the repeater 506-b. Some repeaters 506 may be in communication with the base station 505 via other repeaters 506, for example in a chain configuration. For example, the repeater 506-a and the repeater 506-b may be in a chain, where the repeater 506-b is downstream from the repeater 506-a.

At 515, the base station may determine a multicast message for the quantity of repeaters 506. The multicast message may include control information for the quantity of repeaters 506. In some examples, the control information may include information elements common to the quantity of repeaters 506, as well as information elements specific to an individual repeater 506 (e.g., the repeater 506-a) or a subset of repeaters 506 (e.g., the repeater 506-a and the repeater 506-b) in the quantity of repeaters 506. In some examples, the control information may include one or more configuration parameters (e.g., switching the repeaters on or off, setting a forwarding direction, configuring one or more beamforming parameters, configuring a power setting, etc.) to be adopted by the quantity of repeaters 506, or the control information may indicate an index corresponding to a preconfigured set of parameters for the repeaters 506. In some examples, the base station 505 may determine to include the multicast message in a PDCCH transmission, a PDSCH transmission, or a combination thereof.

In some examples, at 520 the base station 505 may transmit one or more indications to one or more repeaters 506. In some examples, the indication may be included in at least one of an L1 signal, a DCI message, or a scheduling grant, or any combination thereof. In some examples, the indication may include a group common RNTI for the quantity of repeaters 506, where the quantity of repeaters 506 may be configured to identify the multicast message based on the RNTI. In some examples, a repeater 506 (e.g., the repeater 506-a) may belong to multiple sets of repeaters 506, and may have a respective RNTI associated with each set. In some examples, the indication may include a forwarding instruction associated with the multicast message. In some examples, the forwarding instruction may indicate to the repeater 506-a that a control message (e.g., the multicast message) received on a set of time resources is to be forwarded to the repeater 506-b.

At 525, the base station 505 may transmit the multicast message to the quantity of repeaters 506. In some examples, the multicast message may be transmitted and received using beamforming techniques. In some examples, the base station 505 may transmit the multicast message directly to each repeater 506 in the quantity of repeaters 506 in a single hop control transmission as described herein (e.g., as illustrated in FIG. 3). In some examples, the base station 505 may transmit the multicast message via one or more chains of repeaters 506 in a multi-hop control transmission as described herein (e.g., as illustrated in FIG. 4). For example, the repeater 506-a may receive the multicast message from the base station 505 and determine to forward at least a portion of the multicast message to the repeater 506-b (e.g., based on the forwarding instruction from the base station 505).

At 530, the repeater 506-a may process the multicast message to acquire control information relevant to the repeater 506-a. The repeater 506-a may determine one or more configuration parameters associated with the repeater 506-a for communicating with other wireless devices, such as the repeater 506-b or a UE (not shown). In some examples, the repeater 506-a may buffer digital samples of the multicast message. Additionally or alternatively, the repeater 506-a may decode the multicast message, then re-encode the multicast message (or generate a new control message) to forward to the repeater 506-b.

In some examples, at 535 the repeater 506-a may transmit a control message to the repeater 506-b. In some examples, the repeater 506-a may transmit the control message based on the forwarding instruction from the base station 505. In some examples, the control message may include the entire multicast message, which the repeater 506-a may concurrently decode and forward to the repeater 506-b. In some examples, the control message may include the buffered samples of the multicast message. In some examples, the control message may include the re-encoded multicast message, or the generated new control message.

The operations performed by the base station 505 and the repeaters 506 may support improvement to communication operations at the repeaters 506 and, in some examples, may promote improvements to reliability of the repeaters 506, among other benefits.

Figure 6:
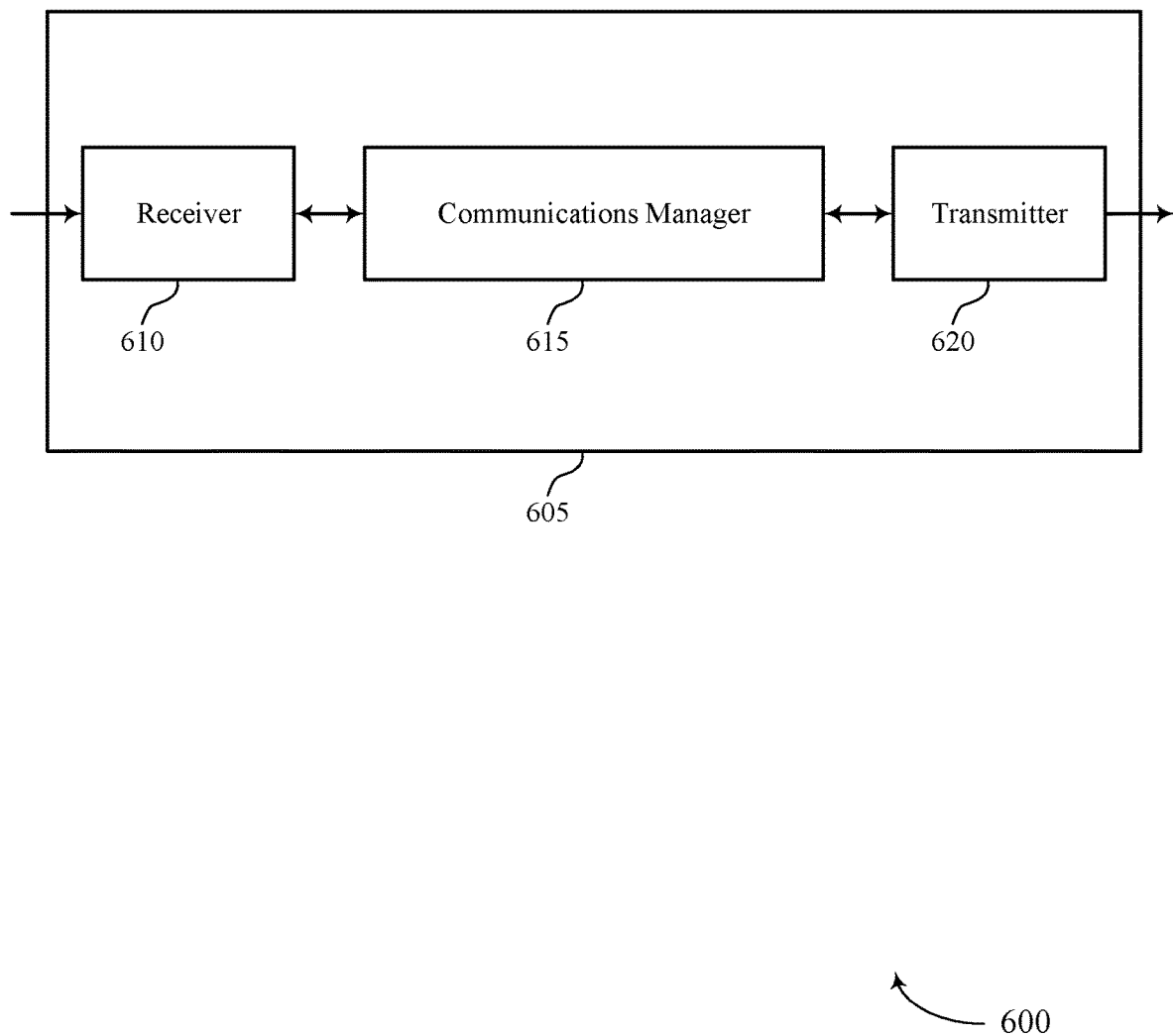
FIGS. 6 and 7 show block diagrams of devices that support repeater configuration via multicast control in accordance with aspects of the present disclosure.

FIG. 6 shows a block diagram 600 of a device 605 that supports repeater configuration via multicast control in accordance with aspects of the present disclosure. The device 605 may be an example of aspects of a repeater 106 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to repeater configuration via multicast control, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a multicast message including common control information for a set of repeaters, the set of repeaters including at least the first repeater and a second repeater, identify one or more configuration parameters associated with the first repeater based on the common control information, and communicate with one or more wireless devices based on the configuration parameters.

The communications manager 615 as described herein may be implemented to realize one or more potential advantages. One implementation may allow the device 605 to save power by communicating with a base station 105 or a repeater 106 (as shown in FIG. 1) more efficiently. For example, the device 605 may efficiently receive control information from a base station 105 in a multicast message, as the device 605 may be able to reconfigure beamforming processes to successfully receive and forward the multicast message while potentially avoiding the latency of multiple control messages. Another implementation may promote low latency communications at the device 605, as a number of resources allocated to signaling overhead may be reduced. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
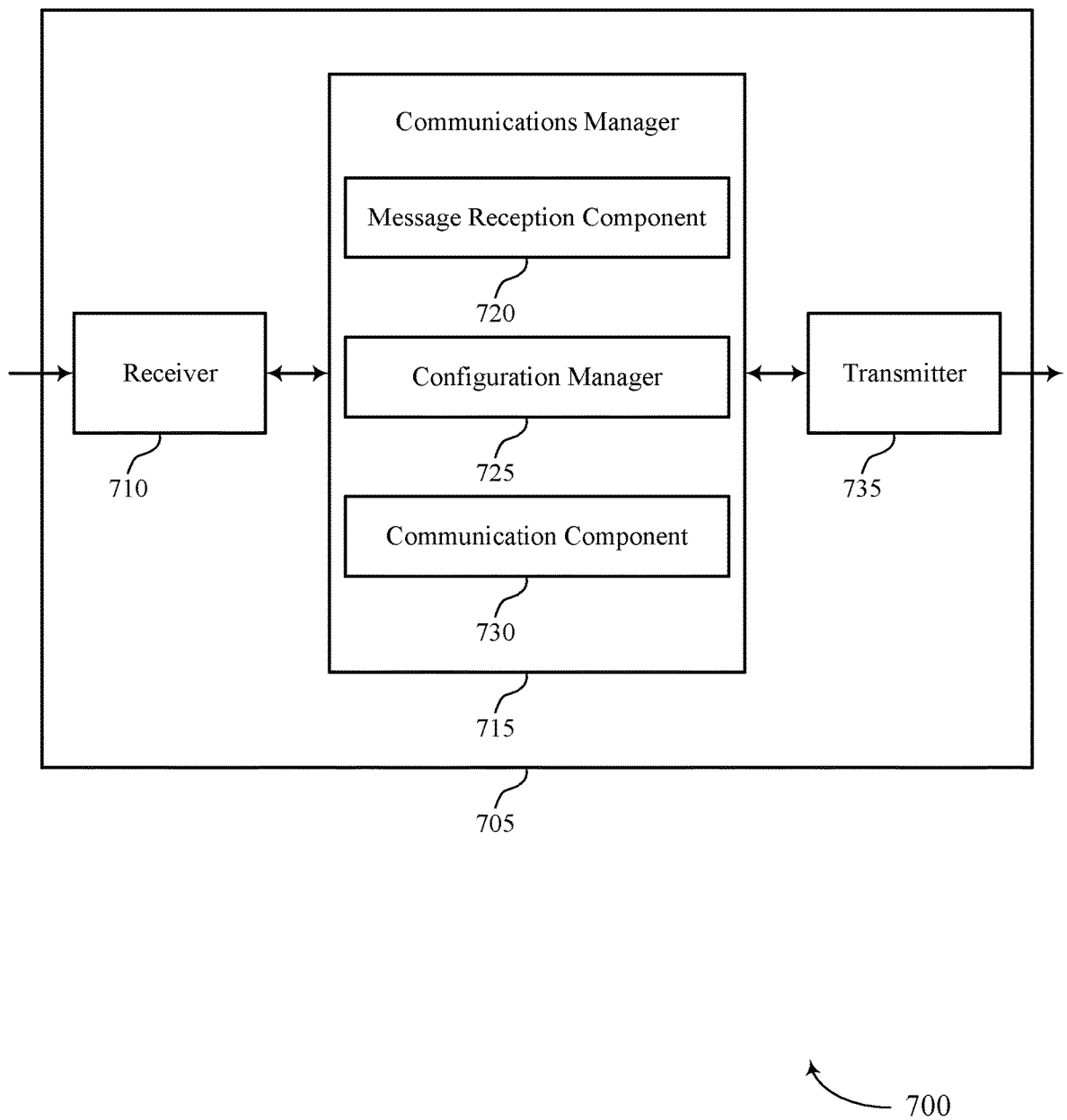

FIG. 7 shows a block diagram 700 of a device 705 that supports repeater configuration via multicast control in accordance with aspects of the present disclosure. The device 705 may be an example of aspects of a device 605, or a repeater 106 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to repeater configuration via multicast control, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a message reception component 720, a configuration manager 725, and a communication component 730. The communications manager 715 may be an example of aspects of the communications manager 910 described herein.

The message reception component 720 may receive, from a base station, a multicast message including common control information for a set of repeaters, the set of repeaters including at least the first repeater and a second repeater.

The configuration manager 725 may identify one or more configuration parameters associated with the first repeater based on the common control information.

The communication component 730 may communicate with one or more wireless devices based on the configuration parameters.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
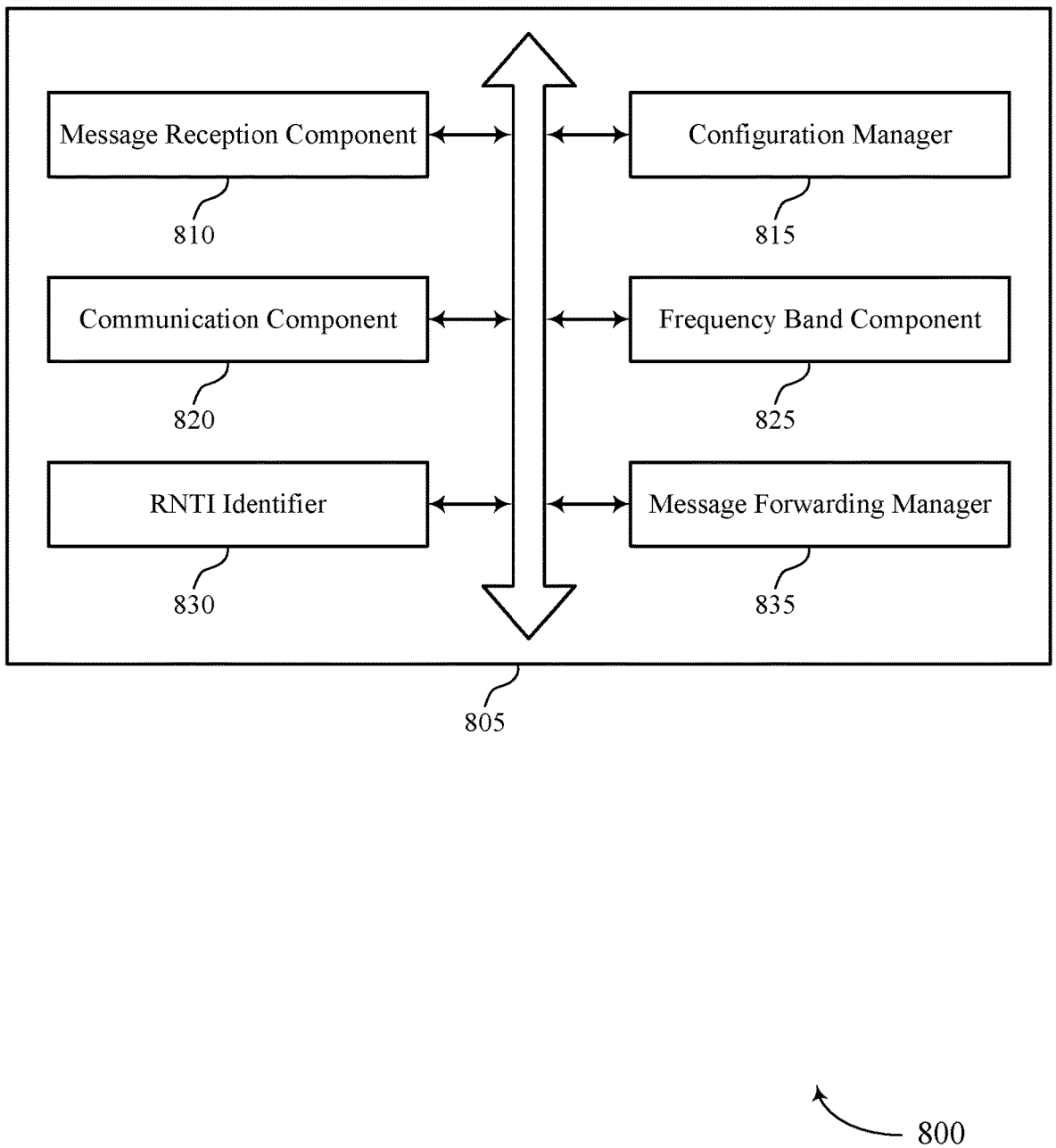
FIG. 8 shows a block diagram of a communications manager that supports repeater configuration via multicast control in accordance with aspects of the present disclosure.

FIG. 8 shows a block diagram 800 of a communications manager 805 that supports repeater configuration via multicast control in accordance with aspects of the present disclosure. The communications manager 805 may be an example of aspects of a communications manager 615, a communications manager 715, or a communications manager 910 described herein. The communications manager 805 may include a message reception component 810, a configuration manager 815, a communication component 820, a frequency band component 825, a RNTI identifier 830, and a message forwarding manager 835. Each of these modules may communicate, directly or indirectly, with one another (e.g., via one or more buses).

The message reception component 810 may receive, from a base station, a multicast message including common control information for a set of repeaters, the set of repeaters including at least the first repeater and a second repeater. In some cases, the multicast message is received in a physical downlink control channel, a physical downlink shared channel, or a combination thereof.

The configuration manager 815 may identify one or more configuration parameters associated with the first repeater based on the common control information. In some cases, the common control information includes a first information element associated with the first repeater and a second information element associated with the second repeater. In some cases, the common control information includes a common information element associated with the first repeater and the second repeater. In some cases, the one or more configuration parameters include a forwarding direction, one or more beamforming parameters, a power setting, or a combination thereof. In some cases, the common control information includes one or more indices corresponding to the one or more configuration parameters.

The communication component 820 may communicate with one or more wireless devices based on the configuration parameters.

The frequency band component 825 may receive the multicast message in a first frequency band. In some examples, the frequency band component 825 may communicate with the one or more wireless devices in a second frequency band, where the first frequency band and the second frequency band are the same or different.

The RNTI identifier 830 may receive a group common radio network temporary identifier associated with the multicast message.

The message forwarding manager 835 may transmit at least a portion of the multicast message to the second repeater based on a forwarding instruction associated with the multicast message. In some examples, the message forwarding manager 835 may receive one or more samples of the multicast message. In some examples, the message forwarding manager 835 may buffer the received one or more samples, where transmitting the portion of the multicast message is based on the buffering. In some examples, the message forwarding manager 835 may decode the multicast message based on the forwarding instruction. In some examples, the message forwarding manager 835 may encode the multicast message based on the decoding, where transmitting the portion of the multicast message is based on the encoding. In some examples, generating a message including the portion of the multicast message based on the decoding, where transmitting the portion of the multicast message to the second repeater includes transmitting the generated message.

In some examples, the message forwarding manager 835 may receive an indication of the forwarding instruction in one or more layer 1 signals, one or more downlink control information messages, one or more scheduling grants, or a combination thereof. In some cases, the forwarding instruction indicates the portion of the multicast to be forwarded to the second repeater. In some cases, the forwarding instruction indicates at least a second portion of the multicast message to be forwarded to one or more additional repeaters.

Figure 9:
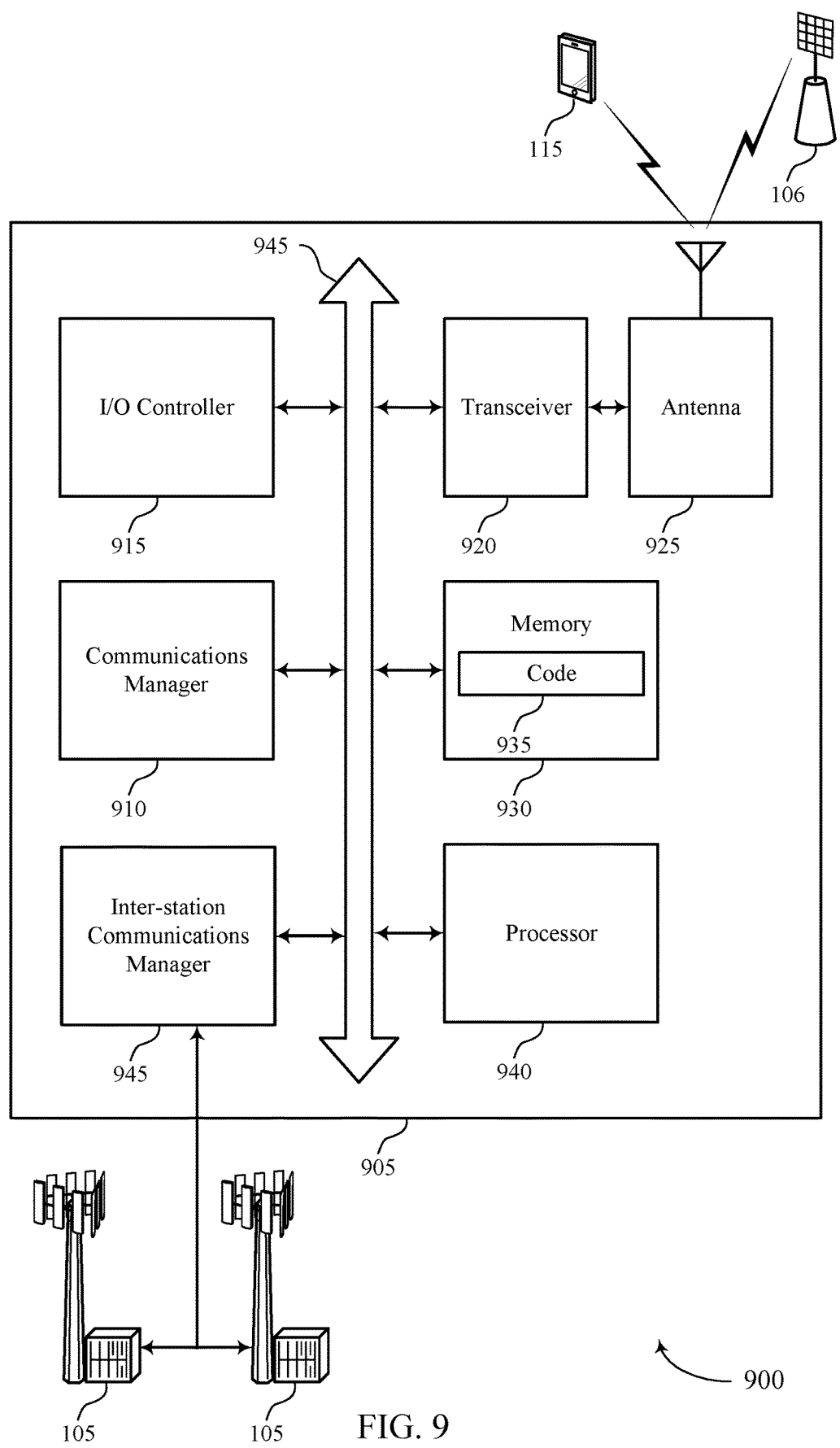
FIG. 9 shows a diagram of a system including a device that supports repeater configuration via multicast control in accordance with aspects of the present disclosure.

FIG. 9 shows a diagram of a system 900 including a device 905 that supports repeater configuration via multicast control in accordance with aspects of the present disclosure. The device 905 may be an example of or include the components of device 605, device 705, or a repeater 106 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a multicast message including common control information for a set of repeaters, the set of repeaters including at least the first repeater and a second repeater, identify one or more configuration parameters associated with the first repeater based on the common control information, and communicate with one or more wireless devices based on the configuration parameters.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may be implemented as part of a processor.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting repeater configuration via multicast control).

The processor 940 of the device 905 (e.g., controlling the receiver 610, the transmitter 620, or the transceiver 920) may reduce power consumption and increase control signaling reliability based on receiving and processing multicast messages. In some examples, the processor 940 of the device 905 may reconfigure parameters for receiving and forwarding the multicast message. For example, the processor 940 of the device 905 may turn on one or more processing units for receiving a multicast message transmission, increase a processing clock, or a similar mechanism within the device 905. As such, when subsequent multicast messages are required, the processor 940 may be ready to respond more efficiently through the reduction of a ramp up in processing power. The improvements in power saving and control signaling reliability may further increase energy efficiency at the device 905 (for example, by reducing or eliminating unnecessary or failed multicast message processing or transmissions, etc.).

The inter-station communications manager 945 may manage communications with base stations 105, and may include a controller or scheduler for controlling communications with UEs 115 in cooperation with base stations 105. For example, the inter-station communications manager 945 may coordinate scheduling for transmissions to UEs 115 for various interference mitigation techniques such as beamforming or joint transmission.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
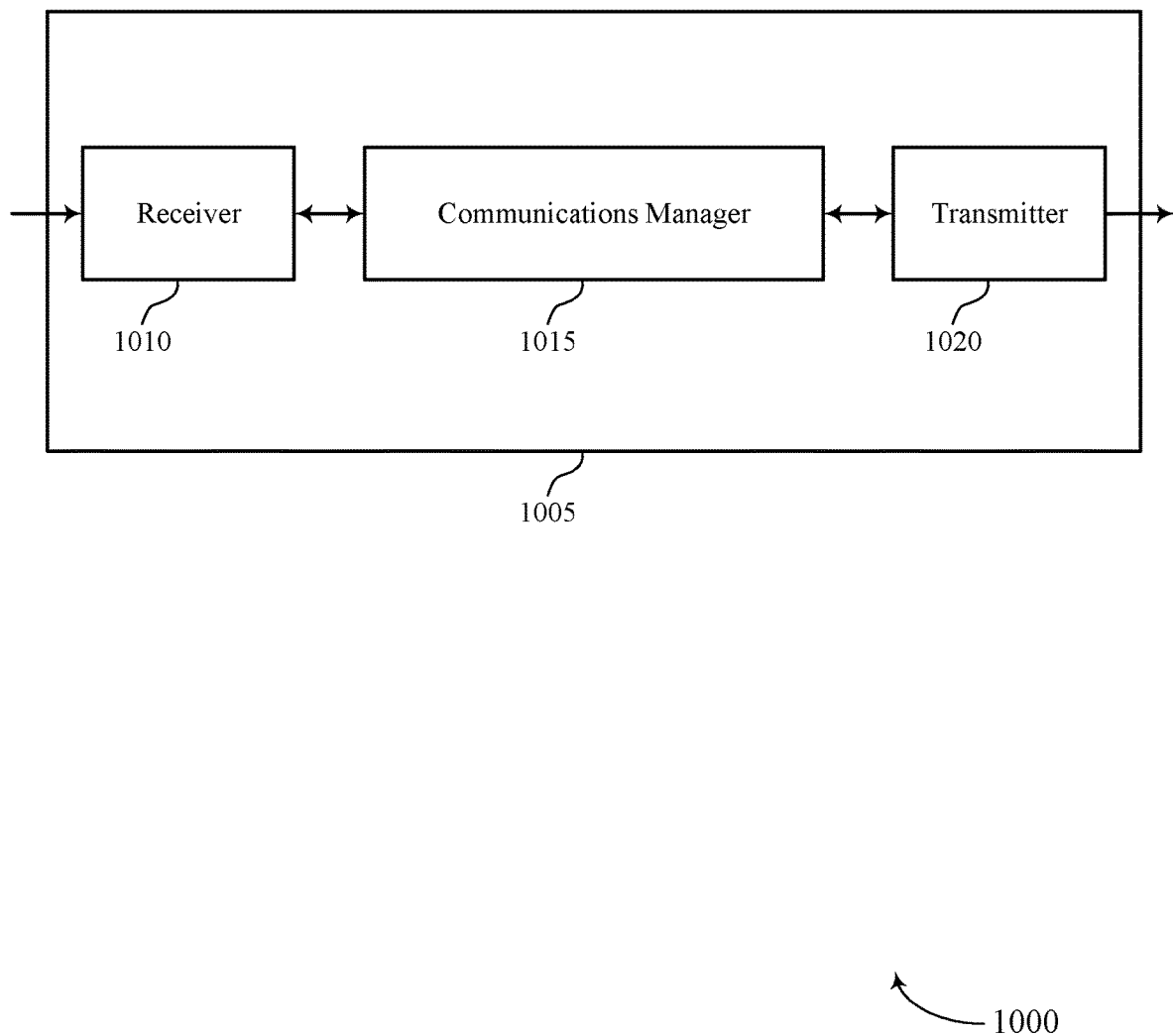
FIGS. 10 and 11 show block diagrams of devices that support repeater configuration via multicast control in accordance with aspects of the present disclosure.

FIG. 10 shows a block diagram 1000 of a device 1005 that supports repeater configuration via multicast control in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to repeater configuration via multicast control, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of repeaters associated with the base station, where the set of repeaters includes at least a first repeater and a second repeater, determine a multicast message including common control information indicating one or more configuration parameters for the set of repeaters, and transmit the multicast message to one or more repeaters of the set of repeaters.

The communications manager 1015 as described herein may be implemented to realize one or more potential advantages. One implementation may allow the device 1005 to save power by communicating with a repeater 106 (as shown in FIG. 1) more efficiently. For example, the device 1005 may reduce signaling overhead in communications with a repeater 106, as the device 1005 may be able to transmit a single multicast control message rather than transmitting multiple individual control messages for repeaters 106. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
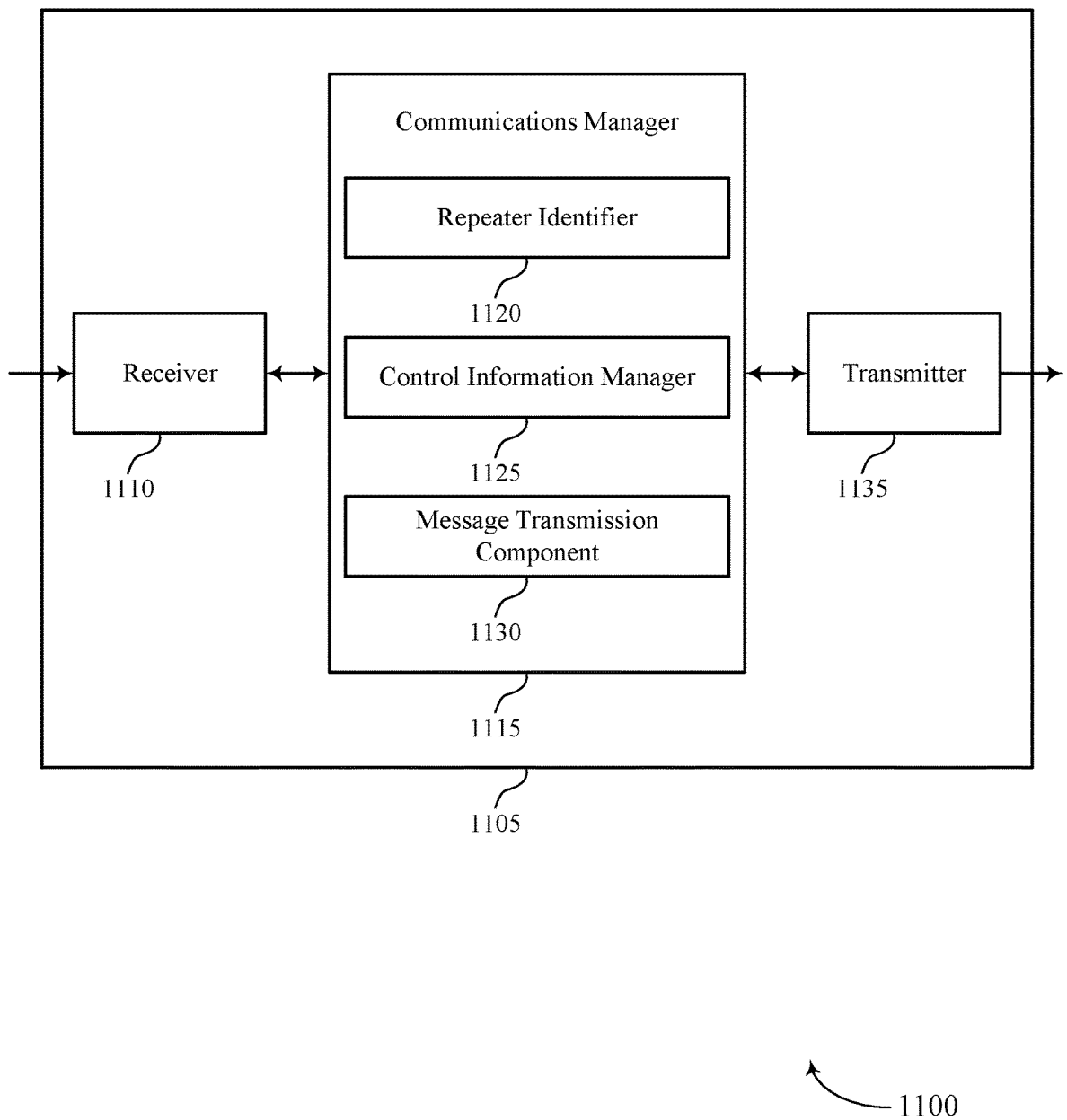

FIG. 11 shows a block diagram 1100 of a device 1105 that supports repeater configuration via multicast control in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to repeater configuration via multicast control, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a repeater identifier 1120, a control information manager 1125, and a message transmission component 1130. The communications manager 1115 may be an example of aspects of the communications manager 1310 described herein.

The repeater identifier 1120 may identify a set of repeaters associated with the base station, where the set of repeaters includes at least a first repeater and a second repeater.

The control information manager 1125 may determine a multicast message including common control information indicating one or more configuration parameters for the set of repeaters.

The message transmission component 1130 may transmit the multicast message to one or more repeaters of the set of repeaters.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
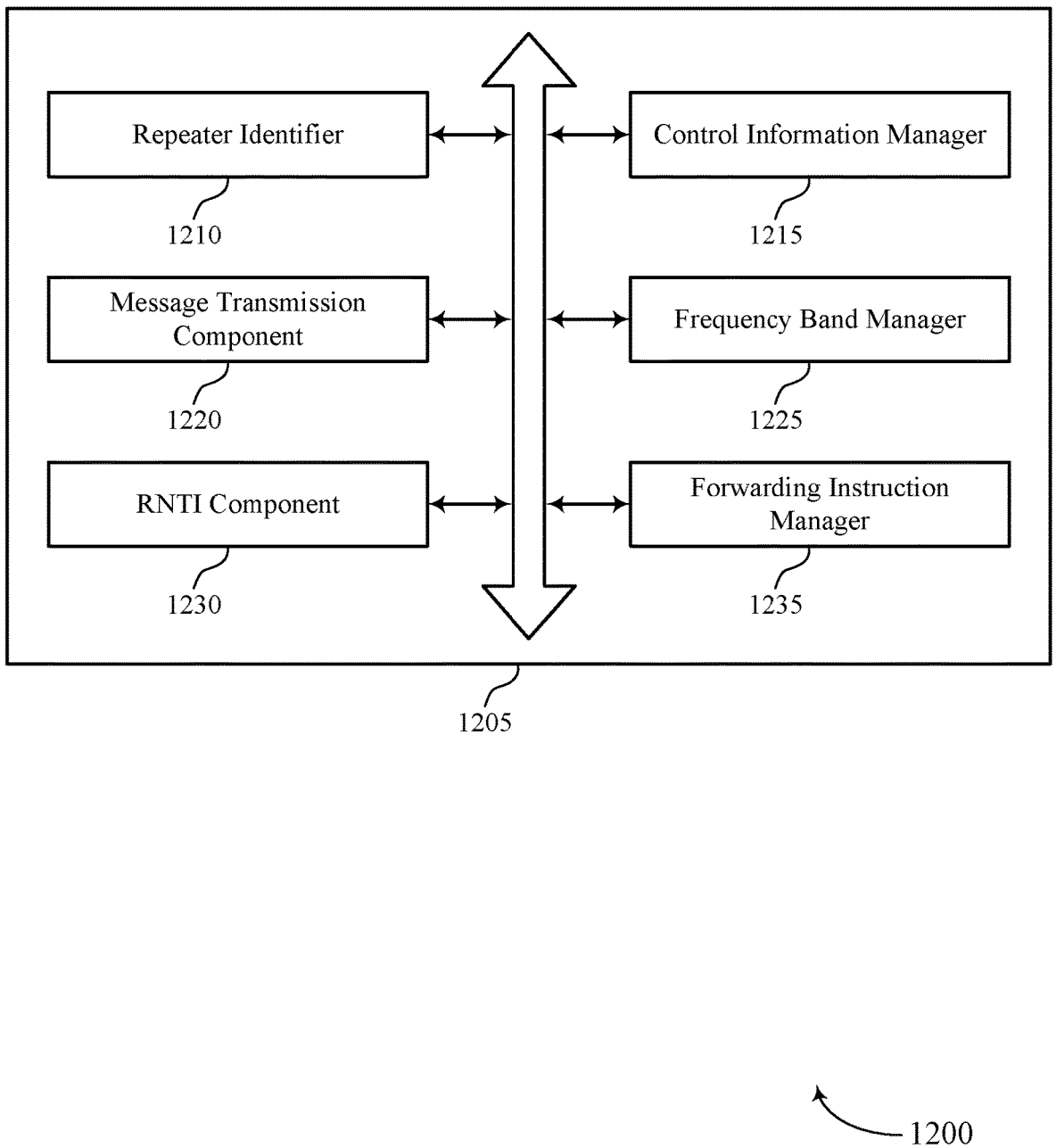
FIG. 12 shows a block diagram of a communications manager that supports repeater configuration via multicast control in accordance with aspects of the present disclosure.

FIG. 12 shows a block diagram 1200 of a communications manager 1205 that supports repeater configuration via multicast control in accordance with aspects of the present disclosure. The communications manager 1205 may be an example of aspects of a communications manager 1015, a communications manager 1115, or a communications manager 1310 described herein. The communications manager 1205 may include a repeater identifier 1210, a control information manager 1215, a message transmission component 1220, a frequency band manager 1225, a RNTI component 1230, and a forwarding instruction manager 1235. Each of these modules may communicate, directly or indirectly, with one another (e.g., via one or more buses).

The repeater identifier 1210 may identify a set of repeaters associated with the base station, where the set of repeaters includes at least a first repeater and a second repeater.

The control information manager 1215 may determine a multicast message including common control information indicating one or more configuration parameters for the set of repeaters. In some cases, the common control information includes a first information element associated with the first repeater and a second information element associated with the second repeater. In some cases, the common control information includes a common information element associated with the first repeater and the second repeater. In some cases, the one or more configuration parameters include a forwarding direction, one or more beamforming parameters, a power setting, or a combination thereof. In some cases, the common control information includes one or more indices corresponding to the one or more configuration parameters.

The message transmission component 1220 may transmit the multicast message to one or more repeaters of the set of repeaters. In some cases, the multicast message is transmitted in a physical downlink control channel, a physical downlink shared channel, or a combination thereof.

The frequency band manager 1225 may transmit the multicast message in a first frequency band. In some examples, the frequency band manager 1225 may transmit a message to the first repeater in a second frequency band, where the first frequency band and the second frequency band are the same or different.

The RNTI component 1230 may transmit a group common RNTI associated with the multicast message to the one or more repeaters.

The forwarding instruction manager 1235 may transmit an indication of a forwarding instruction associated with the multicast message to the one or more repeaters. In some cases, the indication of the forwarding instruction is included in one or more layer 1 signals, one or more downlink control information messages, one or more scheduling grants, or a combination thereof. In some cases, the forwarding instruction indicates at least a portion of the multicast message to be forwarded to the second repeater. In some cases, the forwarding instruction indicates at least a second portion of the multicast message to be forwarded to one or more additional repeaters.

Figure 13:
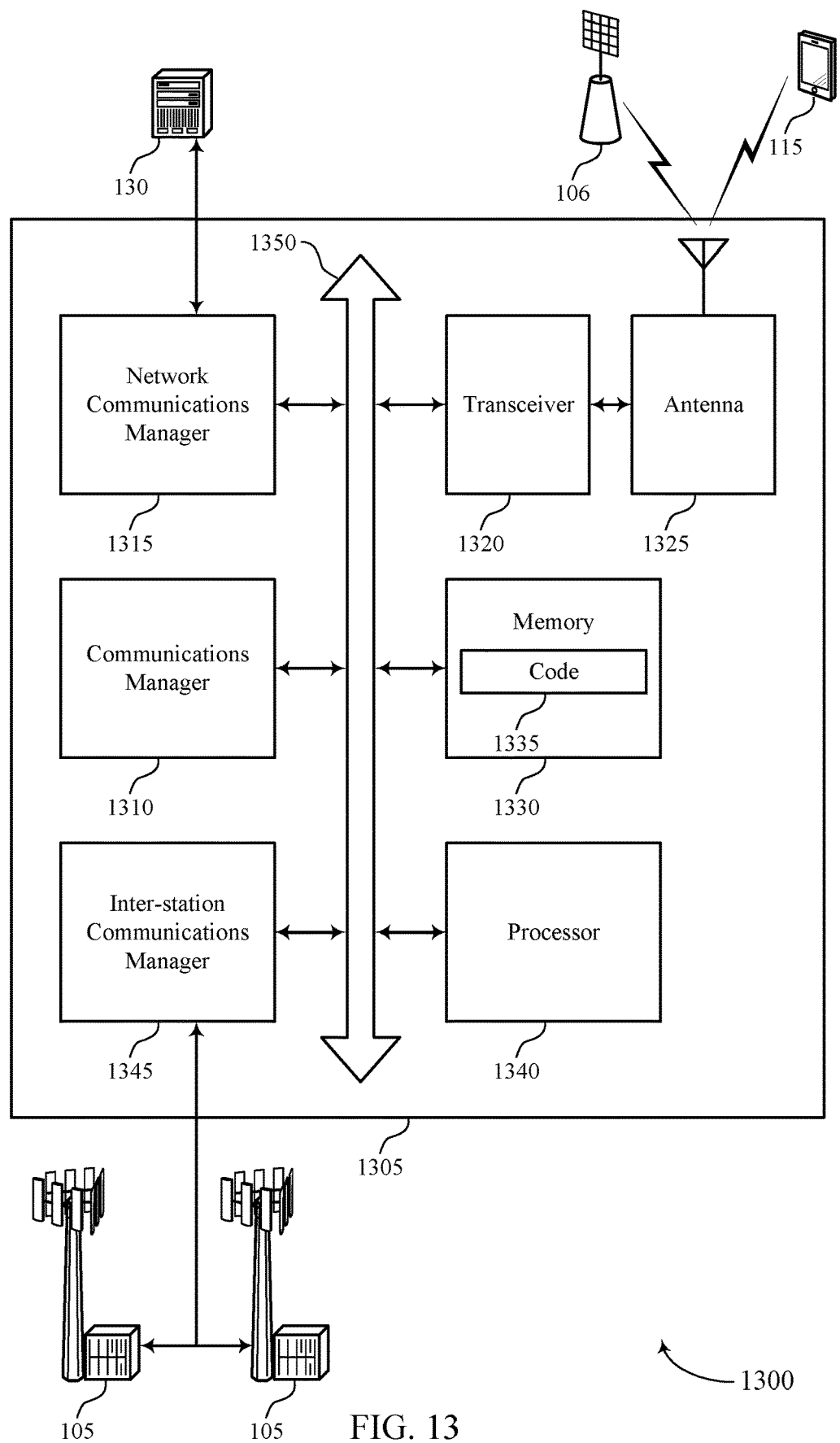
FIG. 13 shows a diagram of a system including a device that supports repeater configuration via multicast control in accordance with aspects of the present disclosure.

FIG. 13 shows a diagram of a system 1300 including a device 1305 that supports repeater configuration via multicast control in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of repeaters associated with the base station, where the set of repeaters includes at least a first repeater and a second repeater, determine a multicast message including common control information indicating one or more configuration parameters for the set of repeaters, and transmit the multicast message to one or more repeaters of the set of repeaters.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting repeater configuration via multicast control).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
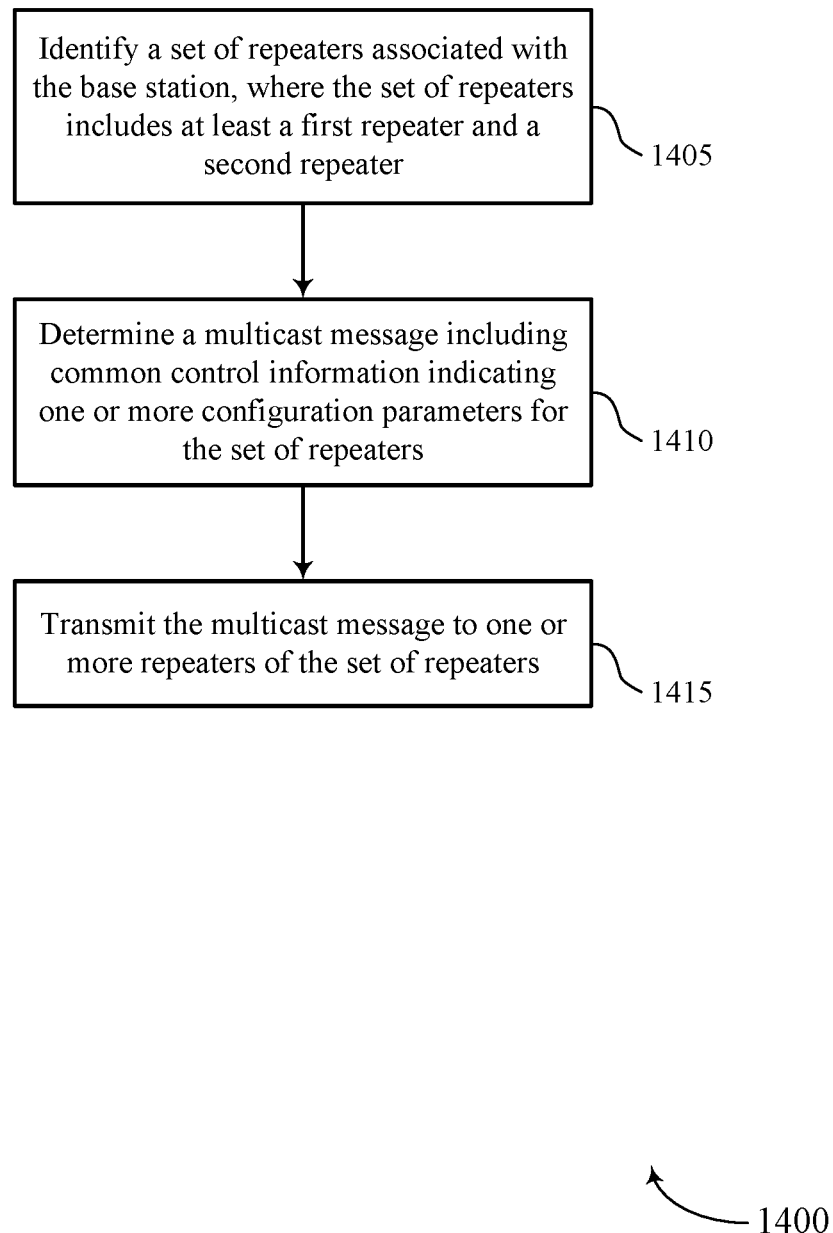
FIGS. 14 through 19 show flowcharts illustrating methods that support repeater configuration via multicast control in accordance with aspects of the present disclosure.

FIG. 14 shows a flowchart illustrating a method 1400 that supports repeater configuration via multicast control in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may identify a set of repeaters associated with the base station, where the set of repeaters includes at least a first repeater and a second repeater. The operations of 1405 may be performed according to the methods described herein. In some examples, aspects of the operations of 1405 may be performed by a repeater identifier as described with reference to FIGS. 10 through 13.

At 1410, the base station may determine a multicast message including common control information indicating one or more configuration parameters for the set of repeaters. The operations of 1410 may be performed according to the methods described herein. In some examples, aspects of the operations of 1410 may be performed by a control information manager as described with reference to FIGS. 10 through 13.

At 1415, the base station may transmit the multicast message to one or more repeaters of the set of repeaters. The operations of 1415 may be performed according to the methods described herein. In some examples, aspects of the operations of 1415 may be performed by a message transmission component as described with reference to FIGS. 10 through 13.

Figure 15:
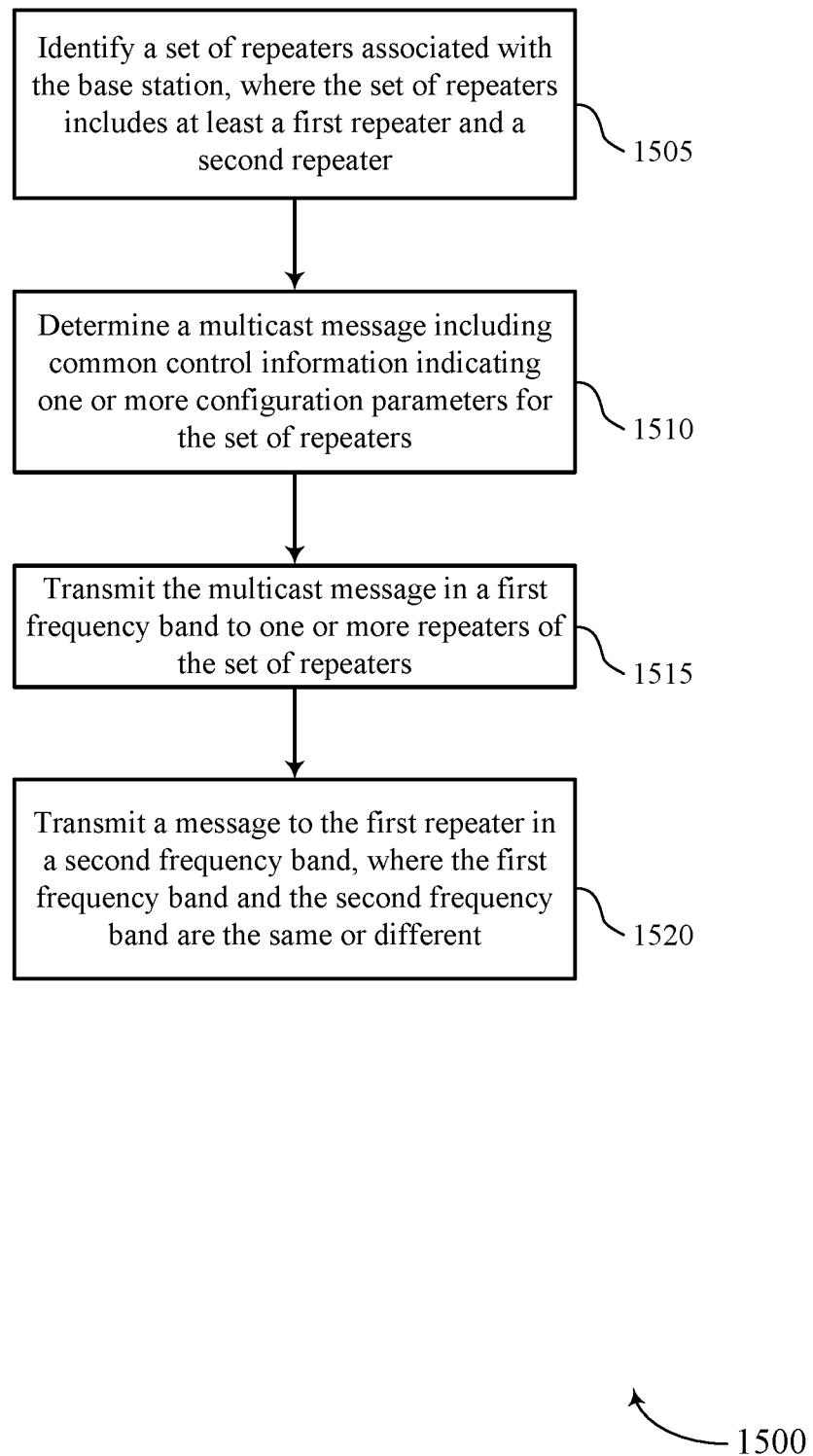

FIG. 15 shows a flowchart illustrating a method 1500 that supports repeater configuration via multicast control in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may identify a set of repeaters associated with the base station, where the set of repeaters includes at least a first repeater and a second repeater. The operations of 1505 may be performed according to the methods described herein. In some examples, aspects of the operations of 1505 may be performed by a repeater identifier as described with reference to FIGS. 10 through 13.

At 1510, the base station may determine a multicast message including common control information indicating one or more configuration parameters for the set of repeaters. The operations of 1510 may be performed according to the methods described herein. In some examples, aspects of the operations of 1510 may be performed by a control information manager as described with reference to FIGS. 10 through 13.

At 1515, the base station may transmit the multicast message in a first frequency band to one or more repeaters of the set of repeaters. The operations of 1515 may be performed according to the methods described herein. In some examples, aspects of the operations of 1515 may be performed by a message transmission component and a frequency band manager as described with reference to FIGS. 10 through 13.

At 1520, the base station may transmit a message to the first repeater in a second frequency band, where the first frequency band and the second frequency band are the same or different. The operations of 1520 may be performed according to the methods described herein. In some examples, aspects of the operations of 1520 may be performed by a frequency band manager as described with reference to FIGS. 10 through 13.

Figure 16:
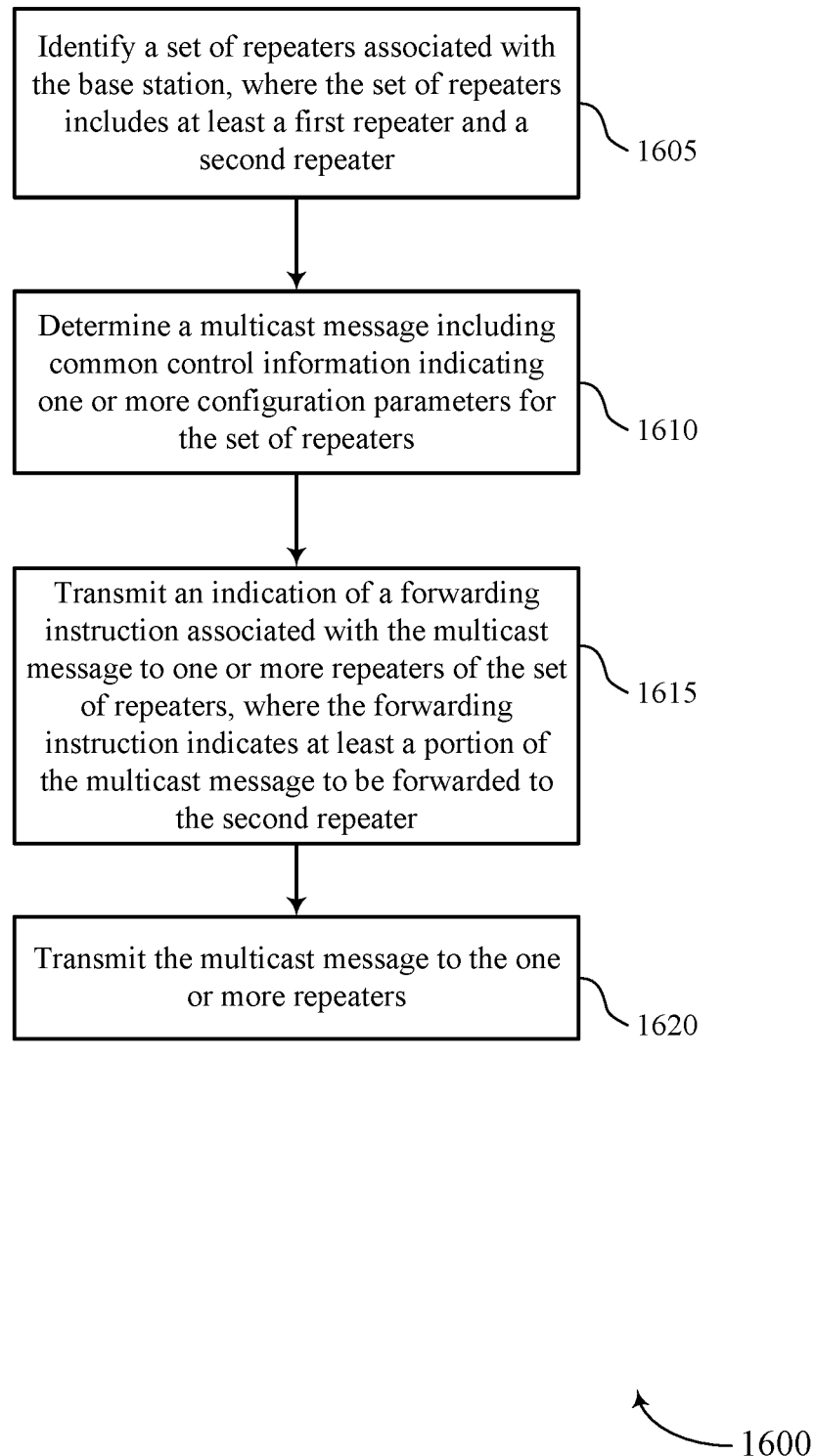

FIG. 16 shows a flowchart illustrating a method 1600 that supports repeater configuration via multicast control in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify a set of repeaters associated with the base station, where the set of repeaters includes at least a first repeater and a second repeater. The operations of 1605 may be performed according to the methods described herein. In some examples, aspects of the operations of 1605 may be performed by a repeater identifier as described with reference to FIGS. 10 through 13.

At 1610, the base station may determine a multicast message including common control information indicating one or more configuration parameters for the set of repeaters. The operations of 1610 may be performed according to the methods described herein. In some examples, aspects of the operations of 1610 may be performed by a control information manager as described with reference to FIGS. 10 through 13.

At 1615, the base station may transmit an indication of a forwarding instruction associated with the multicast message to one or more repeaters of the set of repeaters, where the forwarding instruction indicates at least a portion of the multicast message to be forwarded to the second repeater. The operations of 1615 may be performed according to the methods described herein. In some examples, aspects of the operations of 1615 may be performed by a forwarding instruction manager as described with reference to FIGS. 10 through 13.

At 1620, the base station may transmit the multicast message to the one or more repeaters. The operations of 1620 may be performed according to the methods described herein. In some examples, aspects of the operations of 1620 may be performed by a message transmission component as described with reference to FIGS. 10 through 13.

Figure 17:
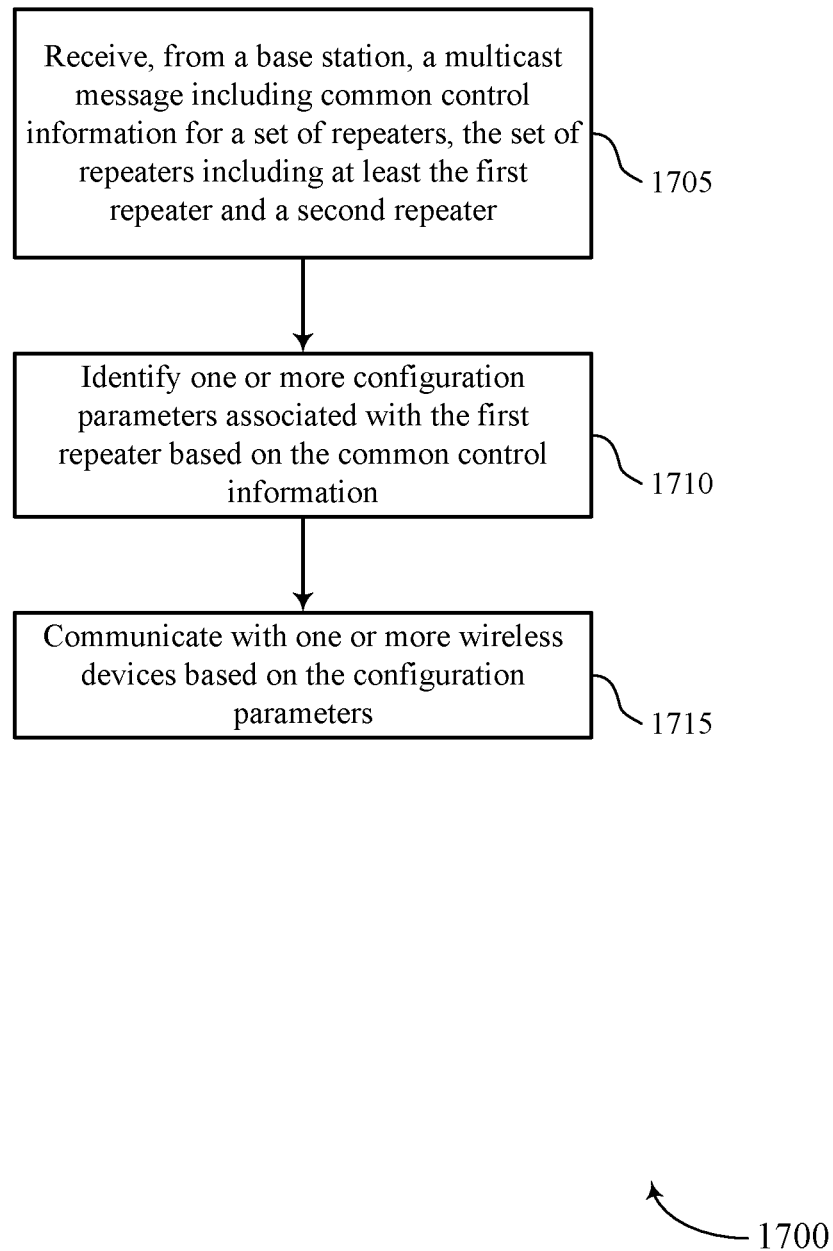

FIG. 17 shows a flowchart illustrating a method 1700 that supports repeater configuration via multicast control in accordance with aspects of the present disclosure. The operations of method 1700 may be implemented by a repeater 106 or its components as described herein. For example, the operations of method 1700 may be performed by a communications manager as described with reference to FIGS. 6 through 9. In some examples, a repeater may execute a set of instructions to control the functional elements of the repeater to perform the functions described below. Additionally or alternatively, a repeater may perform aspects of the functions described below using special-purpose hardware.

At 1705, the repeater may receive, from a base station, a multicast message including common control information for a set of repeaters, the set of repeaters including at least the first repeater and a second repeater. The operations of 1705 may be performed according to the methods described herein. In some examples, aspects of the operations of 1705 may be performed by a message reception component as described with reference to FIGS. 6 through 9.

At 1710, the repeater may identify one or more configuration parameters associated with the first repeater based on the common control information. The operations of 1710 may be performed according to the methods described herein. In some examples, aspects of the operations of 1710 may be performed by a configuration manager as described with reference to FIGS. 6 through 9.

At 1715, the repeater may communicate with one or more wireless devices based on the configuration parameters. The operations of 1715 may be performed according to the methods described herein. In some examples, aspects of the operations of 1715 may be performed by a communication component as described with reference to FIGS. 6 through 9.

Figure 18:
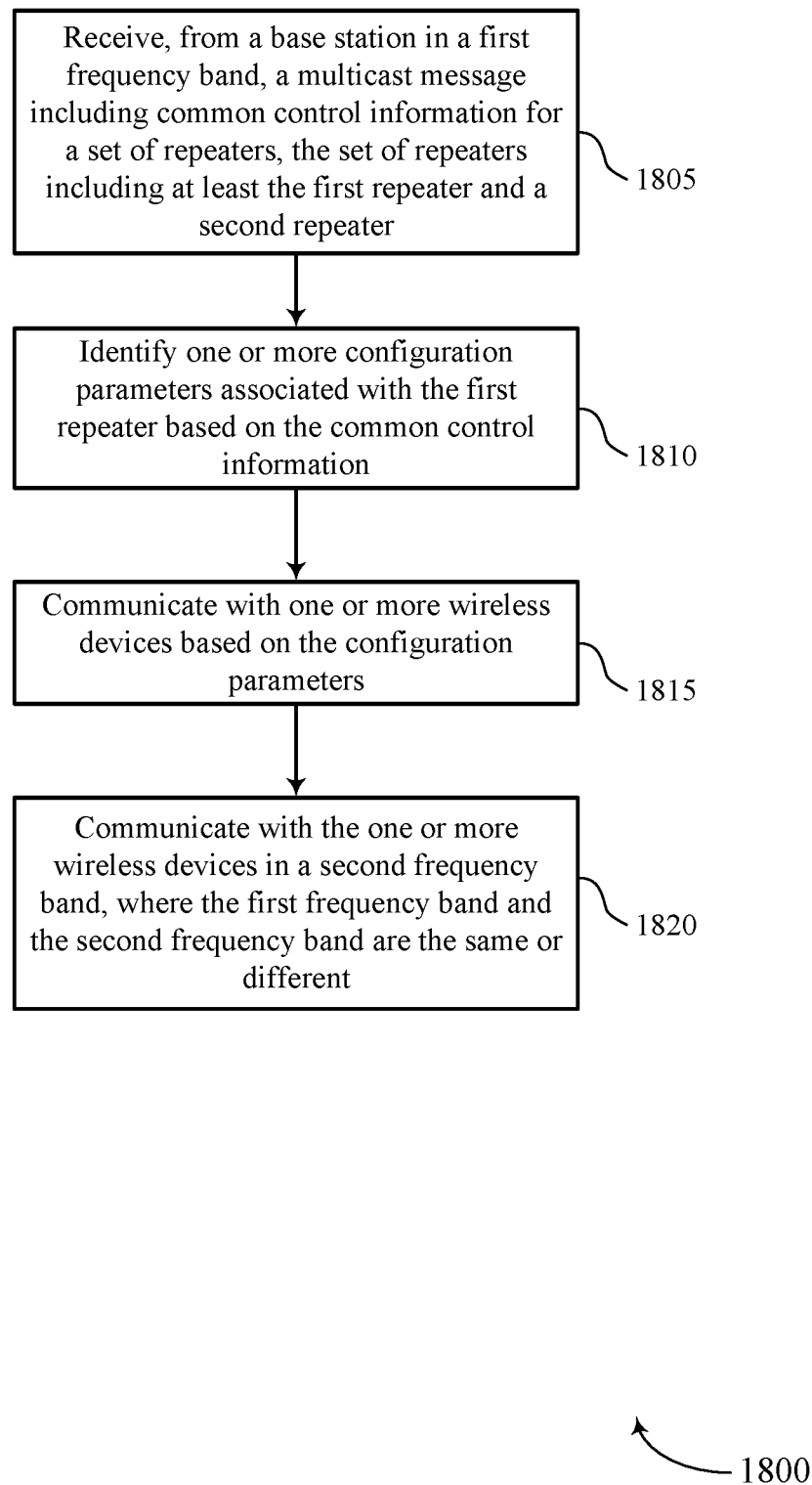

FIG. 18 shows a flowchart illustrating a method 1800 that supports repeater configuration via multicast control in accordance with aspects of the present disclosure. The operations of method 1800 may be implemented by a repeater 106 or its components as described herein. For example, the operations of method 1800 may be performed by a communications manager as described with reference to FIGS. 6 through 9. In some examples, a repeater may execute a set of instructions to control the functional elements of the repeater to perform the functions described below. Additionally or alternatively, a repeater may perform aspects of the functions described below using special-purpose hardware.

At 1805, the repeater may receive, from a base station in a first frequency band, a multicast message including common control information for a set of repeaters, the set of repeaters including at least the first repeater and a second repeater. The operations of 1805 may be performed according to the methods described herein. In some examples, aspects of the operations of 1805 may be performed by a message reception component and a frequency band component as described with reference to FIGS. 6 through 9.

At 1810, the repeater may identify one or more configuration parameters associated with the first repeater based on the common control information. The operations of 1810 may be performed according to the methods described herein. In some examples, aspects of the operations of 1810 may be performed by a configuration manager as described with reference to FIGS. 6 through 9.

At 1815, the repeater may communicate with one or more wireless devices based on the configuration parameters. The operations of 1815 may be performed according to the methods described herein. In some examples, aspects of the operations of 1815 may be performed by a communication component as described with reference to FIGS. 6 through 9.

At 1820, the repeater may communicate with the one or more wireless devices in a second frequency band, where the first frequency band and the second frequency band are the same or different. The operations of 1820 may be performed according to the methods described herein. In some examples, aspects of the operations of 1820 may be performed by a frequency band component as described with reference to FIGS. 6 through 9.

Figure 19:
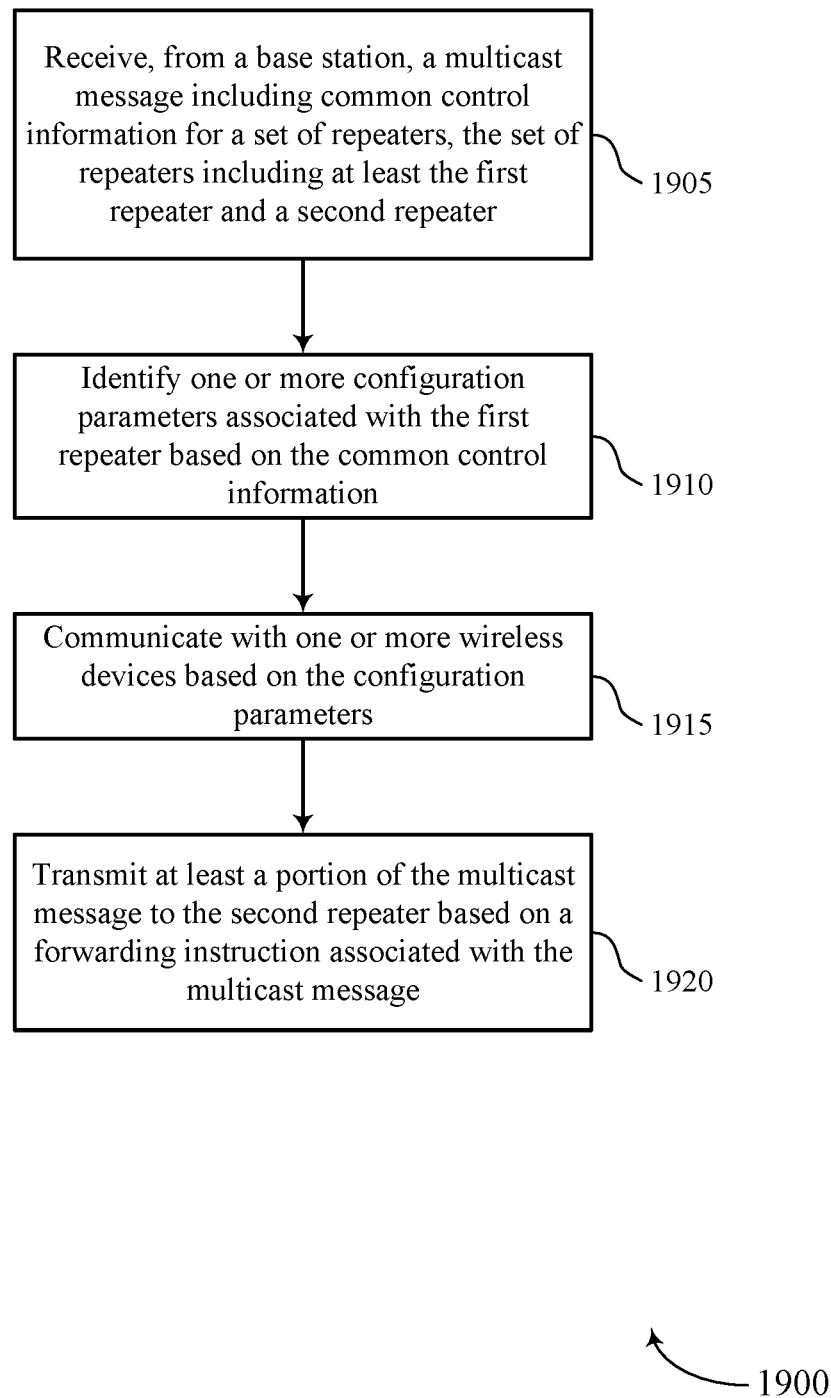

FIG. 19 shows a flowchart illustrating a method 1900 that supports repeater configuration via multicast control in accordance with aspects of the present disclosure. The operations of method 1900 may be implemented by a repeater 106 or its components as described herein. For example, the operations of method 1900 may be performed by a communications manager as described with reference to FIGS. 6 through 9. In some examples, a repeater may execute a set of instructions to control the functional elements of the repeater to perform the functions described below. Additionally or alternatively, a repeater may perform aspects of the functions described below using special-purpose hardware.

At 1905, the repeater may receive, from a base station, a multicast message including common control information for a set of repeaters, the set of repeaters including at least the first repeater and a second repeater. The operations of 1905 may be performed according to the methods described herein. In some examples, aspects of the operations of 1905 may be performed by a message reception component as described with reference to FIGS. 6 through 9.

At 1910, the repeater may identify one or more configuration parameters associated with the first repeater based on the common control information. The operations of 1910 may be performed according to the methods described herein. In some examples, aspects of the operations of 1910 may be performed by a configuration manager as described with reference to FIGS. 6 through 9.

At 1915, the repeater may communicate with one or more wireless devices based on the configuration parameters. The operations of 1915 may be performed according to the methods described herein. In some examples, aspects of the operations of 1915 may be performed by a communication component as described with reference to FIGS. 6 through 9.

At 1920, the repeater may transmit at least a portion of the multicast message to the second repeater based on a forwarding instruction associated with the multicast message. The operations of 1920 may be performed according to the methods described herein. In some examples, aspects of the operations of 1920 may be performed by a message forwarding manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first repeater, comprising:
   receiving a group common radio network temporary identifier associated with the multicast message;
   receiving, in a first frequency band, a multicast message comprising common control information for a plurality of repeaters based at least in part on the group network temporary identifier, the plurality of repeaters comprising at least the first repeater and a second repeater, wherein the common control information comprises at least one or more first information elements common to the plurality of repeaters and one or more second information elements specific to the first repeater;
   identifying one or more configuration parameters associated with the first repeater for communicating with one or more wireless devices based at least in part on the common control information; and
   transmitting, in a second frequency band, signaling to the one or more wireless devices based at least in part on the one or more configuration parameters, wherein the first frequency band and the second frequency band are different.

2. The method of claim 1, further comprising:
   transmitting at least a portion of the multicast message to the second repeater based at least in part on a forwarding instruction associated with the multicast message.

3. The method of claim 2, further comprising:
   receiving one or more samples of the multicast message; and
   buffering the received one or more samples, wherein transmitting the portion of the multicast message is based at least in part on the buffering.

4. The method of claim 2, further comprising:
   decoding the multicast message based at least in part on the forwarding instruction; and
   encoding the multicast message based at least in part on the decoding, wherein transmitting the portion of the multicast message is based at least in part on the encoding.

5. The method of claim 2, further comprising:
   decoding the multicast message based at least in part on the forwarding instruction; and
   generating a message comprising the portion of the multicast message based at least in part on the decoding, wherein transmitting the portion of the multicast message to the second repeater comprises transmitting the generated message.

6. The method of claim 2, further comprising:
   receiving an indication of the forwarding instruction in one or more layer 1 signals, one or more downlink control information messages, one or more scheduling grants, or a combination thereof.

7. The method of claim 2, wherein the forwarding instruction indicates the portion of the multicast to be forwarded to the second repeater.

8. The method of claim 2, wherein the forwarding instruction indicates at least a second portion of the multicast message to be forwarded to one or more additional repeaters.

9. The method of claim 1, wherein the common control information comprises a third information element associated with the second repeater.

10. The method of claim 1, wherein the one or more configuration parameters comprise a forwarding direction, one or more beamforming parameters, a power setting, or a combination thereof.

11. The method of claim 1, wherein the common control information comprises one or more indices corresponding to the one or more configuration parameters.

12. The method of claim 1, wherein the multicast message is received in a physical downlink control channel, a physical downlink shared channel, or a combination thereof.

13. An apparatus for wireless communications at a first repeater, comprising:
a processor,
memory coupled with the processor; and
instructions stored in the memory and executable by the processor to cause the apparatus to:
receive a group common radio network temporary identifier associated with the multicast message;
receive, in a first frequency band, a multicast message comprising common control information for a plurality of repeaters based at least in part on the group network temporary identifier, the plurality of repeaters comprising at least the first repeater and a second repeater, wherein the common control information comprises at least one or more first information elements common to the plurality of repeaters and one or more second information elements specific to the first repeater;
identify one or more configuration parameters associated with the first repeater for communicating with one or more wireless devices based at least in part on the common control information; and
transmit, in a second frequency band, signaling to the one or more wireless devices based at least in part on the one or more configuration parameters, wherein the first frequency band and the second frequency band are different.

* * * * *